(12) United States Patent
Ishii et al.

(10) Patent No.: US 8,439,446 B2
(45) Date of Patent: May 14, 2013

(54) VEHICLE SEAT RECLINING DEVICE

(75) Inventors: Koji Ishii, Nagoya (JP); Satoshi Umezu, Nagoya (JP)

(73) Assignee: Ansei Corporation, Obu-Shi (JP)

( * ) Notice: Subject to any disclaimer, the term of this patent is extended or adjusted under 35 U.S.C. 154(b) by 124 days.

(21) Appl. No.: 13/051,763

(22) Filed: Mar. 18, 2011

(65) Prior Publication Data

US 2011/0233981 A1  Sep. 29, 2011

(30) Foreign Application Priority Data

Mar. 26, 2010 (JP) ................. 2010-071173

(51) Int. Cl.
*B60N 2/20* (2006.01)
(52) U.S. Cl.
USPC ............ 297/378.13; 297/378.11; 297/378.12; 296/65.16
(58) Field of Classification Search ............ 297/378.13, 297/378.11, 378.12, 143, 359; 292/341.12; 49/449, 49/450; 296/65.16, 65.17
See application file for complete search history.

(56) References Cited

U.S. PATENT DOCUMENTS

| | | | | |
|---|---|---|---|---|
| 2,860,905 | A | * | 11/1958 | Wiese ...................... 292/341.12 |
| 6,312,055 | B1 | * | 11/2001 | Uematsu .................. 297/378.13 |
| 7,377,584 | B2 | * | 5/2008 | Griswold et al. ........ 297/216.12 |
| 7,641,282 | B2 | * | 1/2010 | Hinata et al. ............. 297/216.14 |
| 8,146,996 | B2 | * | 4/2012 | Vedder et al. ............ 297/378.13 |
| 2008/0088167 | A1 | | 4/2008 | Okazaki et al. |

FOREIGN PATENT DOCUMENTS

| | | |
|---|---|---|
| JP | 2003-312329 A | 11/2003 |
| JP | 2008-94227 | 4/2008 |

OTHER PUBLICATIONS

U.S. Appl. No. 13/020,220, filed Feb. 3, 2011.

* cited by examiner

*Primary Examiner* — David Dunn
*Assistant Examiner* — Timothy J Brindley
(74) *Attorney, Agent, or Firm* — J-TEK Law PLLC; Jeffrey D. Tekanic

(57) ABSTRACT

A vehicle seat reclining device comprises a latch mechanism having latch holes defined in a rail along a central axial line, a slider hole penetrating through a slider so as to be alignable with the latch holes, a support portion slidably supported on the slider, and a lever coupled to the support portion so as to be pivotable about an axis that is substantially parallel to the central axial line. A latch claw is extends from the lever and is engageable with the respective latch holes via the slider hole. A first amount of play is provided between the support portion and the lever in a direction parallel to the central axial line. A second amount of play, which is less than the first amount play, is provided between the slider hole and the latch claw in the direction parallel to the central axial line.

20 Claims, 16 Drawing Sheets

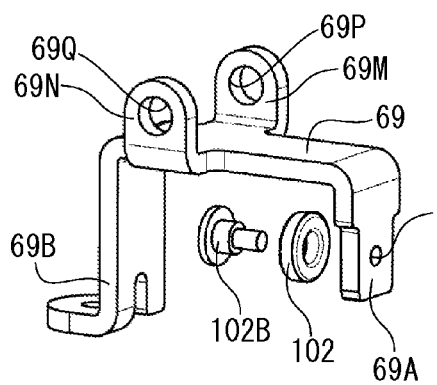
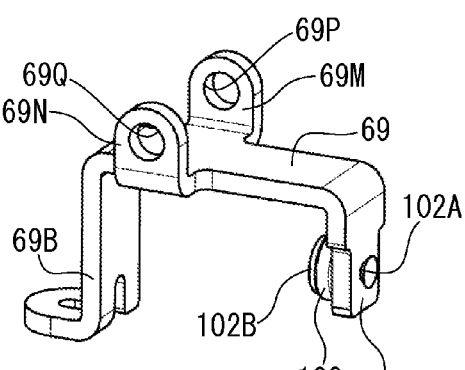
FIG. 16a    FIG. 16b
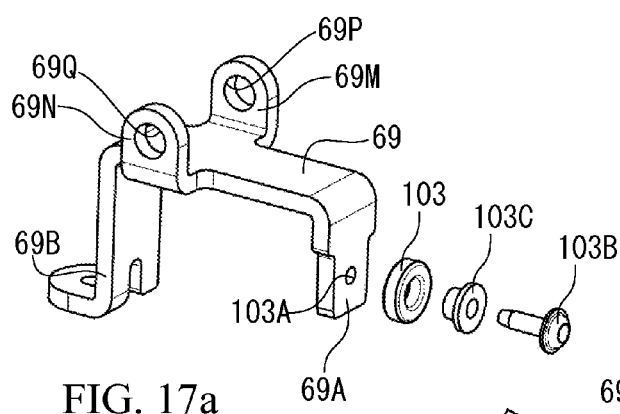
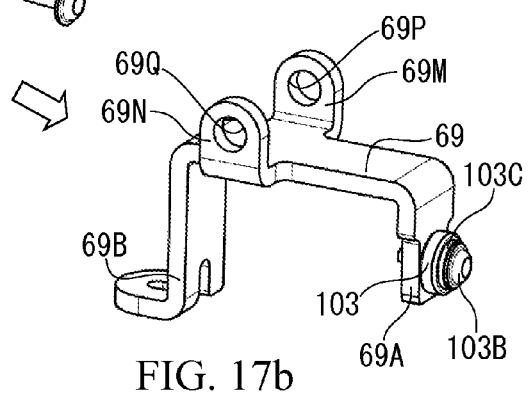
FIG. 17a    FIG. 17b

VEHICLE SEAT RECLINING DEVICE

CROSS-REFERENCE TO RELATED APPLICATION

This application claims the priority benefit of Japanese Patent Application No. 2010-071173 filed on Mar. 26, 2010, the entire contents of which are incorporated by reference as if fully set forth herein.

TECHNICAL FIELD

The present teachings relate to a seat reclining device, preferably for use in a vehicle, and the manufacture and use thereof.

BACKGROUND

Japanese Patent Laid-Open Publication No. 2003-312329 discloses a vehicle seat reclining device that includes a portion affixed to the vehicle body, which cooperates with a locking device affixed to a tiltable seatback of a vehicle seat so as to permit the seatback to be selectively locked in a stepwise manner in a series of tilted positions. The vehicle seat reclining device comprises a rail, a slider and a latch mechanism.

The rail extends along a central axial line and is affixed to the vehicle body. The rail is curved so as to follow or be aligned with a curved path traced in space by the locking device as the backrest tilts. The slider is slidably attached to the rail and includes a striker that is engageable with the locking device. The latch mechanism is provided between the rail and the slider so as to selectively prevent and permit sliding of the slider along the rail.

More particularly, the latch mechanism includes a plurality of latch holes formed in the rail and aligned along the central axial line, a slider hole penetrating through the slider so as to face and be alignable with each of the respective latch holes, a support portion provided on the slider, and a lever supported on the support portion so as to be pivotable about a pivot shaft that is substantially parallel to the central axial line. A latch claw is disposed on a tip end of the lever and is engageable with the respective latch holes via the slider hole.

In the known vehicle seat reclining device having the above-described configuration, the latch mechanism can be operated so as to disengage the latch claw from the respective latch holes, thereby enabling a change of the tilted position of the backrest by sliding the slider along the rail. The backrest can then be fixed at a desired tilted position by engaging the latch claw with the corresponding latch hole.

SUMMARY

A typical countermeasure for eliminating rattling of the backrest while it is fixed in a tilted position in known vehicle seat reclining devices, such as the above-described device, is to minimize the amount of play between the support portion and the lever in a direction parallel to the central axial line. In other words, when a load is applied to the fixed backrest, such load is transmitted from the locking device to the latch hole via the striker, the slider, the support portion, the lever and the latch claw. Consequently, the rail ultimately supports this load. At this time, a reaction force acts on the latch claw from the engaged latch hole in the direction parallel to the central axial line. Due to this reaction force, the lever having the latch claw is displaced in the direction parallel to the central axial line within the range of the above-mentioned play until the lever is stopped by abutting against the support portion, such that the support portion supports the reaction force. Therefore, by reducing the amount of play, the rattling of the backrest will be reduced.

However, when employing such a known configuration, the support portion for supporting the reaction force must have a relatively strong or robust configuration in order to ensure long-term durability. However, by designing the support portion in such a robust manner, other problems often result, such as increased weight and higher manufacturing costs.

Accordingly, in one aspect of the present teachings, a vehicle seat reclining device is provided that is capable of realizing a weight savings. In addition or in the alternative, the vehicle seat reclining device may also achieve manufacturing cost reductions.

In another aspect of the present teachings, a vehicle seat reclining device may be affixed to a lateral side or side wall of a vehicle body and preferably cooperates or operates together with a locking device that is affixed to a tiltable backrest of a vehicle seat in order to stepwise lock the backrest in a selected tilted position. The vehicle seat reclining device may generally comprise a rail, a slider and a latch mechanism.

The rail preferably extends, e.g., linearly, along a central axial line and may be affixed to the lateral side of the vehicle body so as to align, overlap or intersect with a path, e.g., a curved path, that the locking device will trace in space as the backrest tilts. For example, the central axial line is preferably at least substantially tangential to the movement path of the locking device. The slider may be slidably provided on the rail and preferably includes a fixedly attached striker that is configured to engage with the locking device attached to the backrest. The latch mechanism is provided between the rail and the slider so as to selectively prevent and permit sliding of the slider.

The latch mechanism preferably includes a plurality of latch holes formed in the rail and aligned along the central axial line, a slider hole penetrating through the slider so as to face and/or be alignable with the respective latch holes, a support portion provided on the slider, and a lever supported on the support portion so as to be pivotable about a pivot shaft that is disposed substantially parallel to the central axial line. A latch claw is preferably provided on a tip or terminal end of the lever and is engageable with the respective latch holes via the slider hole.

A first amount of play is provided between the support portion and the lever in a direction parallel to the central axial line. A second amount of play is provided between the slider hole and the latch claw in the direction parallel to the central axial line. The second amount of play is smaller or less than the first amount of play.

With this configuration, when a load is applied to the backrest that is fixed at a tilted position, such load is first transmitted from the locking device to striker and the slider, and is then transmitted to the latch hole via the slider hole and the latch claw, so that the rail ultimately supports this load. In other words, this load is not transmitted from the slider to the latch claw via the support portion and the lever as in the above-described known art, but rather is transmitted from the slider to the latch claw via the slider hole. At this time, a reaction force from the latch hole, which is engaged by the latch claw, acts on the latch claw in the direction parallel to the central axial line. Due to this reaction force, the lever having the latch claw is displaced in the direction parallel to the central axial line. However, since the second amount of play is smaller or less than the first amount of play, the lever is prevented from abutting against or being forcibly pressed against the support portion, because the movement of the latch claw in the direction parallel to the central axial line is stopped by first abutting against the slider hole. Therefore, the reaction force is supported by the slider hole rather than by the support portion. As a result, it is not necessary to design the support portion as a relatively strong or robust structure for supporting this reaction force, i.e. as a structure that may increase the overall weight of the latch mechanism and/or the manufacturing costs.

Thus, a vehicle seat reclining device according to such a preferred embodiment is capable of realizing a weight savings and/or a reduction in manufacturing costs.

Further, in the above-described prior art, the support portion supports the reaction force emanating from the latch claw. Thus, when the reaction force is applied to the lever, the displacement of the entire lever tends to be large. Therefore, when an impact load acts on the backrest due to a sudden braking or a sudden loading on the backrest, a large inertial force is likely to act on the lever. This may cause the defect that the lever pivots due to the inertial force, even though it is not being intentionally operated, and the latch claw undesirably disengages from the latch hole. Especially in the above-described prior art, the portion of the latch claw that directly abuts against the latch hole is often formed in a tapered shape. In such embodiments, however, the above-described defect, i.e. the latch claw undesirably disengages from the latch hole, is likely to occur when at least one component of the impact load acts in the direction that causes the latch claw to disengage from the latch hole.

On the other hand, in one aspect of the present teachings, the edge of the slider hole proximal to the latch claw supports the reaction force, whereby displacement of the entire lever is restricted when a reaction force is applied thereto, i.e. the displacement is less than in the above-described prior art. It is thus possible to reduce the inertial force acting on the lever when an impact load acts on the backrest due to a sudden braking or loading, etc. This can prevent the latch claw from undesirably disengaging from the latch hole (i.e. when it is not being intentionally operated) when the lever pivots due to an inertial force.

BRIEF DESCRIPTION OF THE DRAWINGS

FIGS. 16a and 16b show perspective views of a modified dampener according to the present teachings.

FIGS. 17a and 17b show perspective views of another modified dampener according to the present teachings.

DETAILED DESCRIPTION

An embodiment of the present invention will now be described with references to the drawings. In this respect, FIG. 1 should be viewed with the understanding that the right-hand side of the sheet is directed towards the front side of a vehicle while the left-hand side of the sheet is directed towards the rear side of the vehicle and that the near side of the sheet is directed towards the right-hand side of the vehicle while the far side of the sheet is directed towards the left-hand side of the vehicle. Each of the horizontal direction, the forward and rearward directions and the vertical direction as indicated in each of the subsequent drawings correspond to the respective directions shown in FIG. 1.

Figure 1:
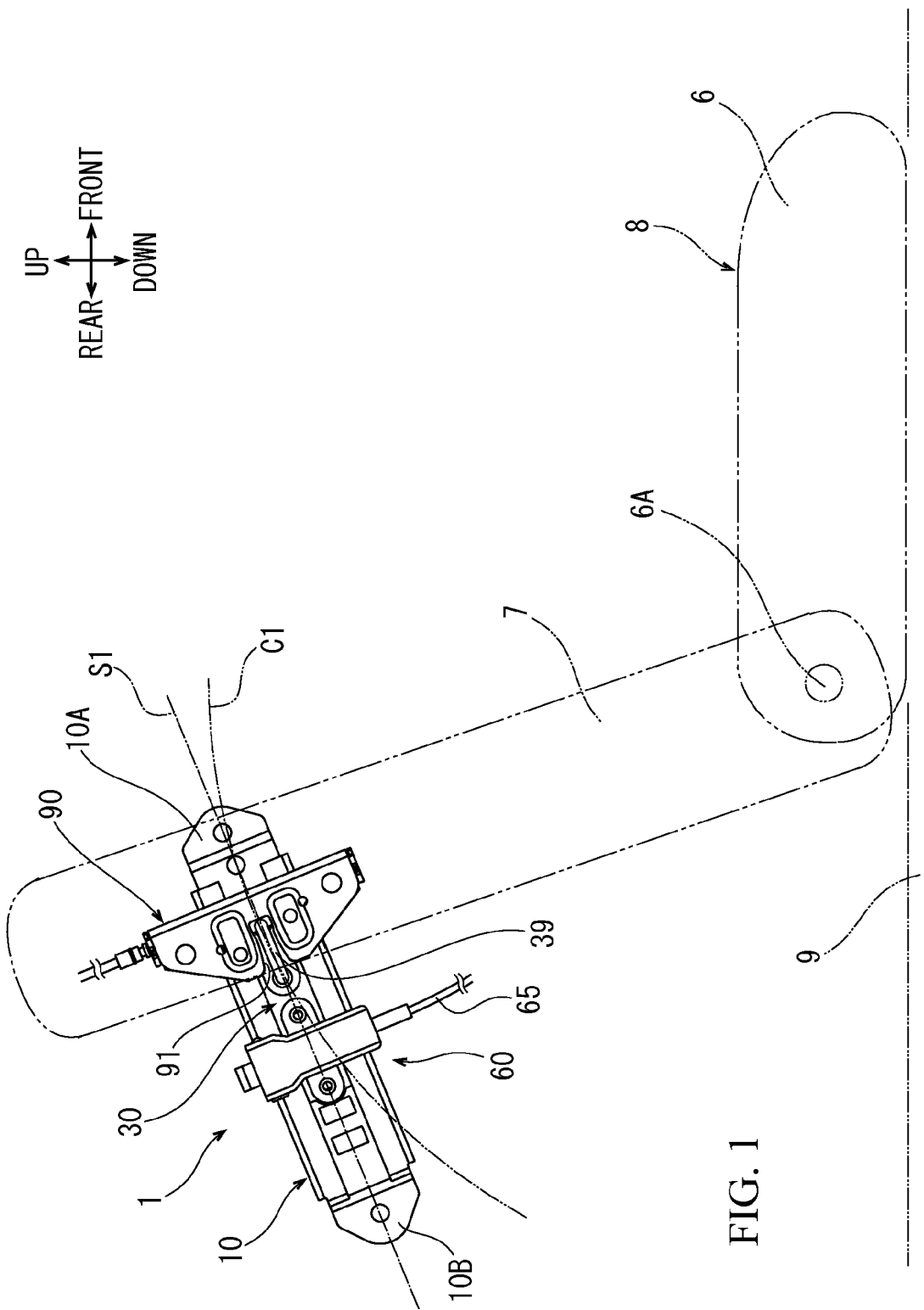
FIG. 1 is a schematic side view showing the relative positional relationships of a backrest, a locking device and a seat reclining device according to a vehicle seat reclining device of a representative embodiment of the present teachings.

As shown in FIG. 1, the representative vehicle seat reclining device 1 may be utilized with a vehicle seat 8 mounted on a floor of a vehicle body 9 together with a locking device 90 mounted on a lateral side of a vehicle seat backrest 7. The vehicle seat 8 comprises a seat main body 6, on which a passenger sits, and a backrest 7, against which the passenger leans. The backrest 7 is tiltably supported on a support shaft 6A provided at a rearward end portion of the seat main body 6 and rises up from the rearward end portion of the seat main body 6 in an oblique, rearward direction when in its normal operating position.

The locking device 90 is affixed to a generally upper portion of the left-side surface of the backrest 7, i.e. on the far side of the backrest 7 in FIG. 1, such that the backrest 7 is actually disposed between the viewer and the locking device 90. The locking device 90 may have a known configuration including a recessed opening 91 and a fork (not shown) that is displaceable to close the recessed opening 91. While a more detailed description will given below, it is noted here that, when the fork closes the recessed opening 91 with a striker 39 of the vehicle seat reclining device 1 inserted into the recessed opening 91, the locking device 90 engages with the striker 39 to fix the tilted position of the backrest 7. Further, the striker 39 is displaceable in a stepwise manner in the forward and rearward directions, which displacement is transmitted to the backrest 7 via the locking device 90 so as to change the tilted position of the backrest 7 in a stepwise manner. When the backrest 7 tilts, the locking device 90 traces a curved or arched path C1 in space and the center of the generally circular path C1 is the support shaft 6A.

While not shown in the drawings, a release lever for releasing the engagement between the locking device 90 and the striker 39 is provided in the vicinity of the vehicle seat 8. The release lever may be used, for instance, when the backrest 7 is to be folded forward in order to load a large piece of luggage behind the backrest 7. In this case, when the passenger operates the release lever, the locking device 90 will disengage from the striker 39, so that the backrest 7 can be folded (pivoted) forward about the support shaft 6A.

The vehicle seat reclining device 1 is provided on the left-hand side (on the far side of the locking device 90 in FIG. 1) of the locking device 90 and is attached to the lateral side of the vehicle body 9. The vehicle seat reclining device 1 comprises a rail 10, a slider 30 and a latch mechanism 60.

As shown in more detail in FIGS. 2 to 5, the rail 10 may be formed by bending a metallic steel plate to substantially have a "C" shape in cross-section and to linearly extend along a central axial line S1. As shown in FIG. 6 (a cross-section along line VI-VI in FIG. 5), an inner wall surface of the rail 10 extends in parallel with the central axial line S1 and serves as a first guide surface 11. Second guide surfaces 12A, 12B are defined by a pair of wall surfaces that each extend at a right angle from the respective end edges of the first guide surface 11 in the width direction (the horizontal direction in FIG. 6) and extend in parallel with the central axial line S1. Further, third guide surfaces 13A, 13B are defined by a pair of inward-facing wall surfaces that each extend from the respective end edges of the second guide surfaces 12A, 12B. The third guide surfaces 13A, 13B are spaced from the first guide surface 11 so as to extend in parallel with the first guide surface 11. If the rail 10 has such a cross-sectional shape, it is easy to increase the bend or flexural strength of the rail 10 while limiting or minimizing the height of the rail 10.

Figure 2:
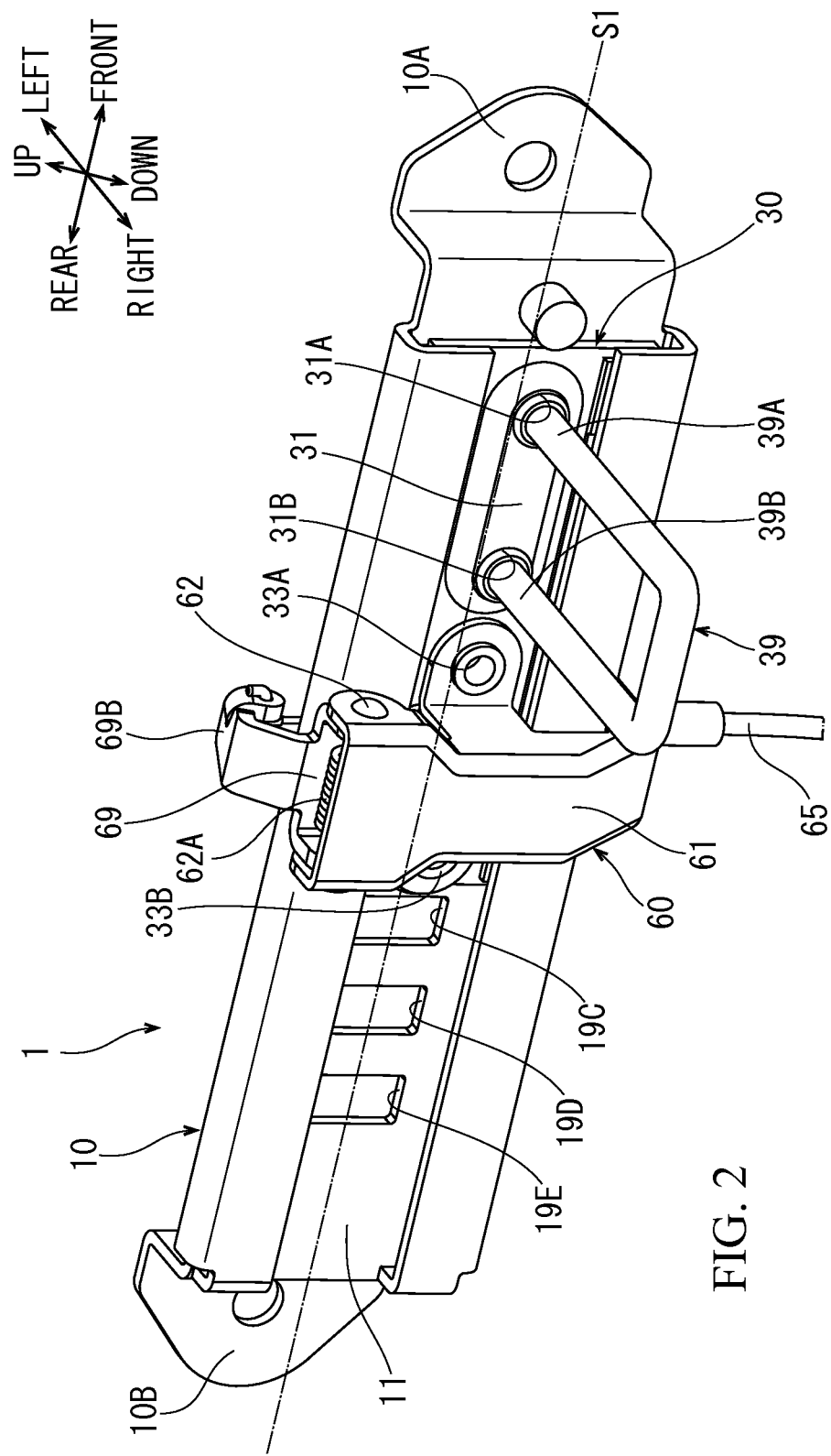
FIG. 2 is a perspective view of the vehicle seat reclining device according to the representative embodiment.
Figure 3:
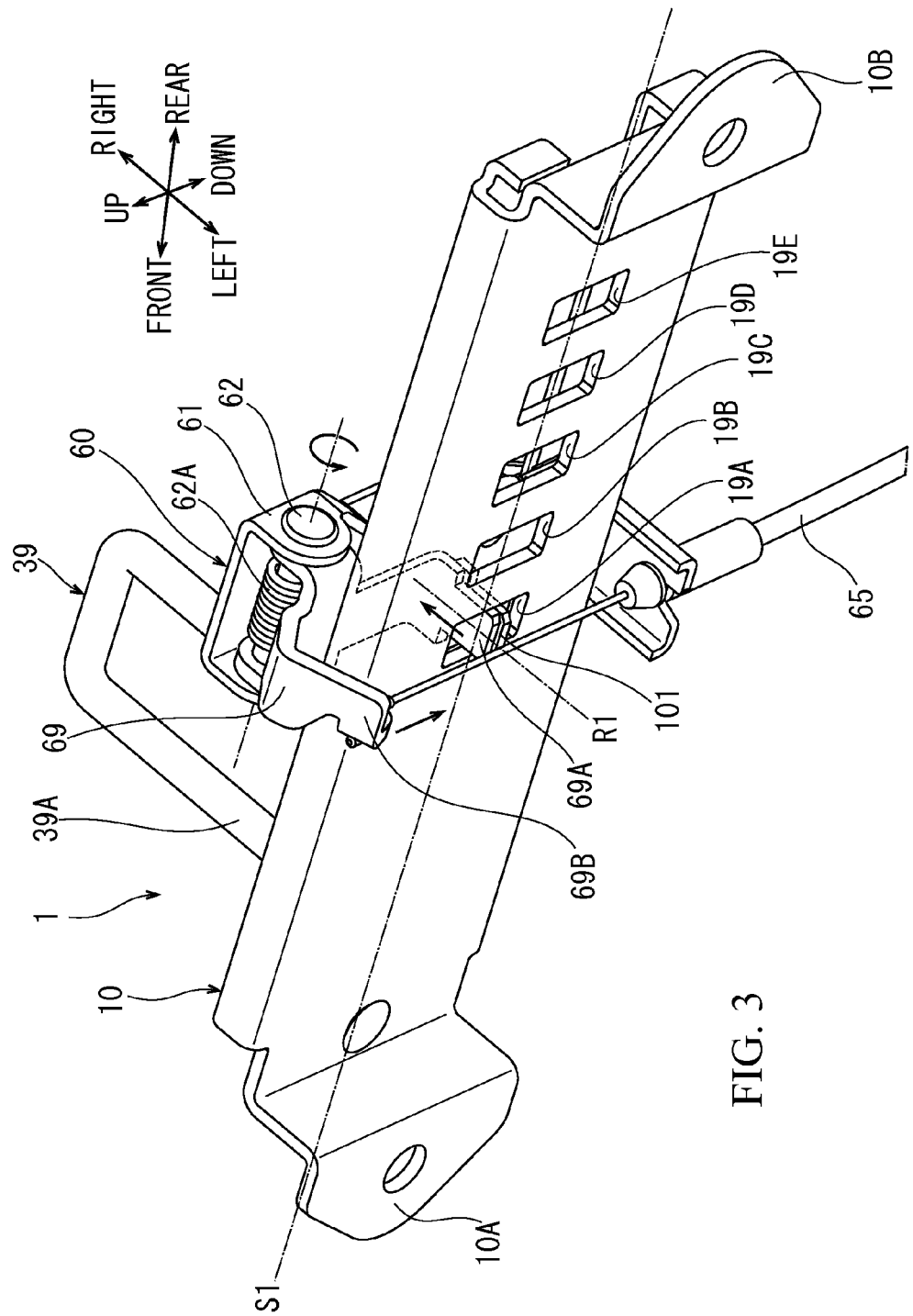
FIG. 3 is another perspective view of the vehicle seat reclining device according to the representative embodiment.

As shown in FIGS. 2 and 3, crank-like mounting portions 10A, 10B are formed on a forward end side and a rearward end side of the rail 10, respectively. The rail 10 is affixed to the vehicle body 9 by attaching these mounting portions 10A, 10B to the vehicle body 9 using fastening screws or the like. At this time, as shown in FIG. 1, the rail 10 is positioned on the vehicle body 9 such that the central axial line S1 of the rail 10 is at least substantially tangential to the arc C1 traced by the locking device 90 when the backrest 7 is tilted forward and rearward. That is, the central axial line S1 of the rail 10 preferably at least overlaps and/or intersects the arc C1 while being substantially parallel to or aligned with a tangent of the arc C1.

Figure 4:
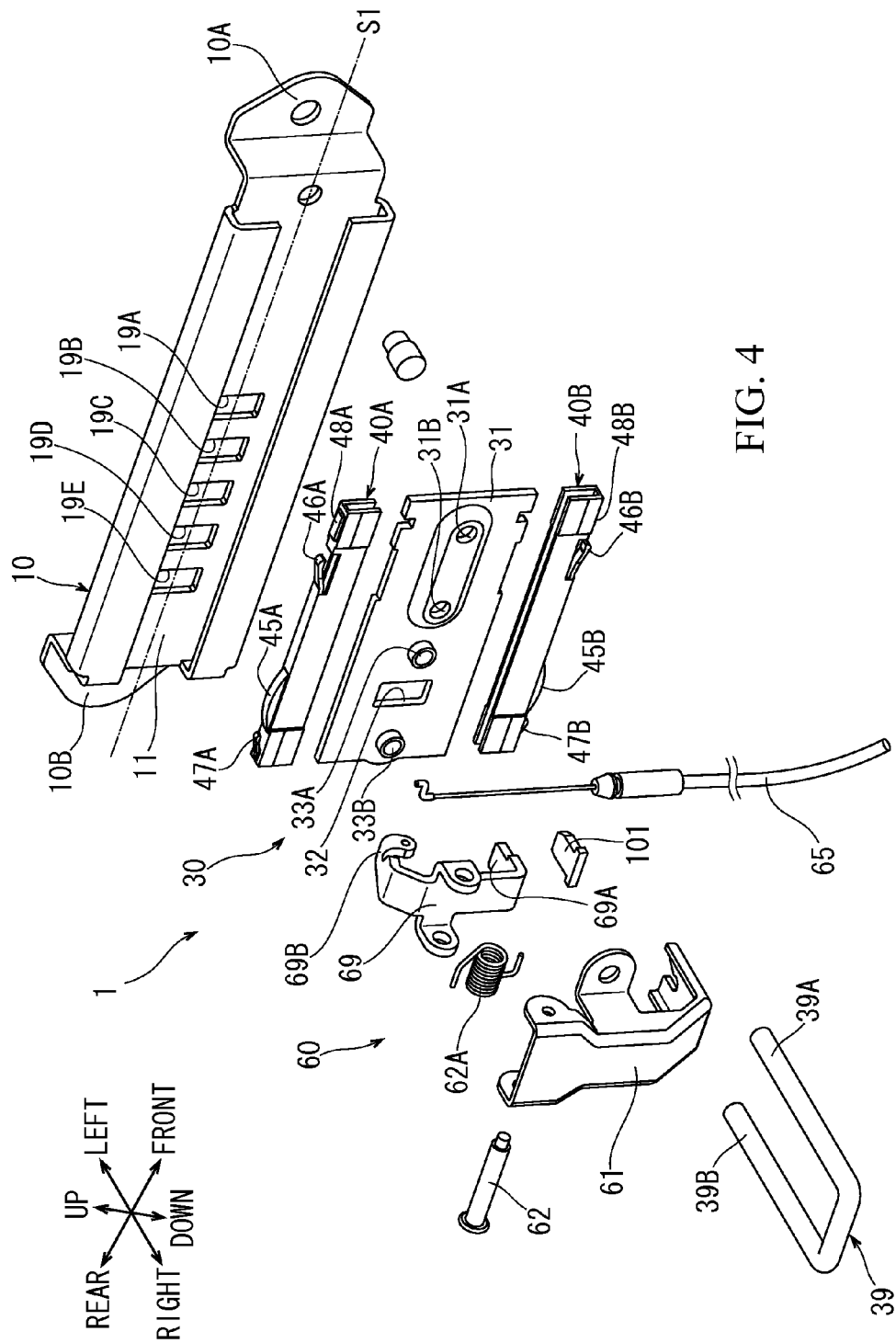
FIG. 4 is an exploded perspective view of the vehicle seat reclining device according to the representative embodiment.
Figure 5:
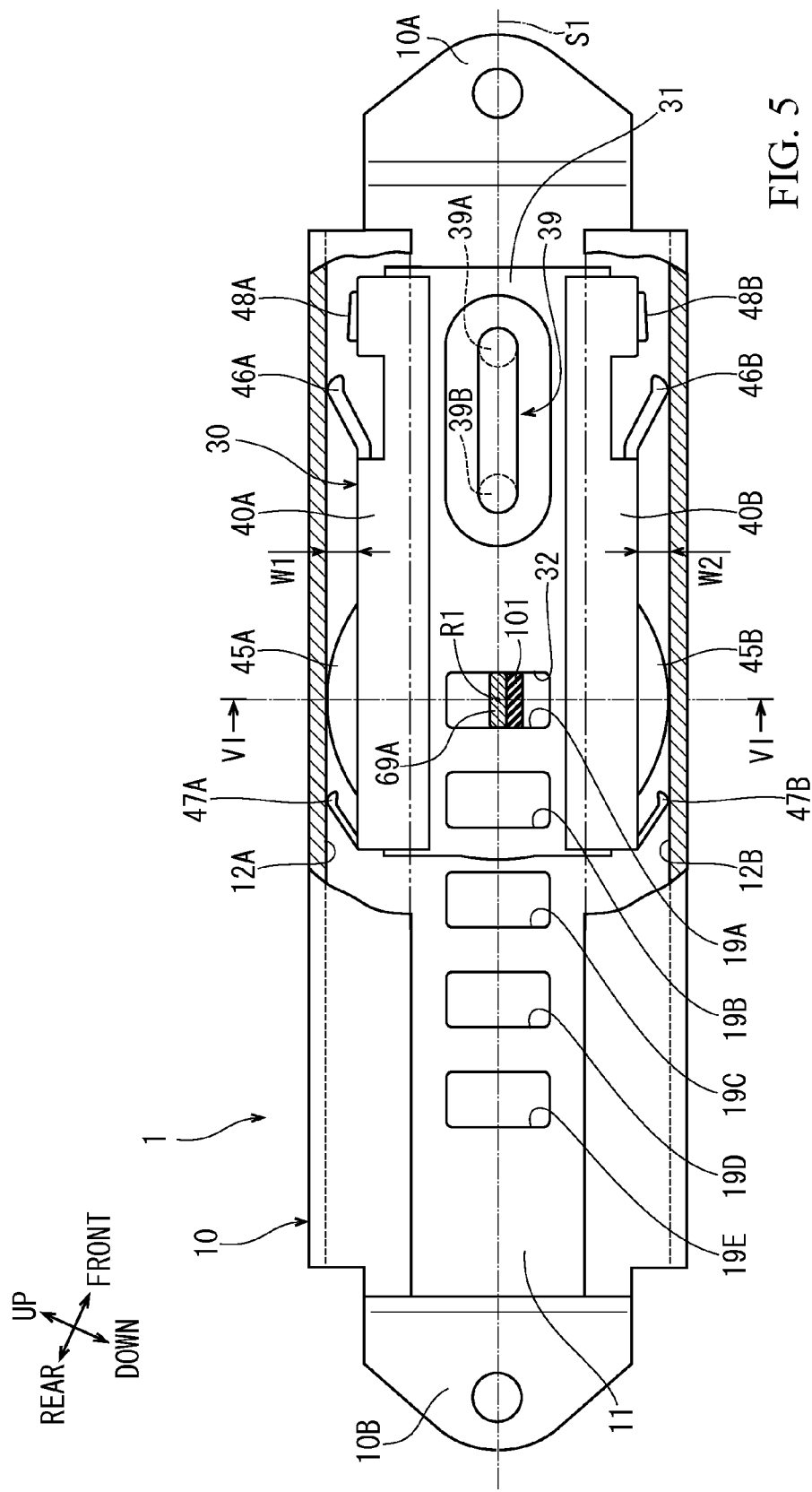
FIG. 5 is a side view (partial sectional view) for explaining the rotation or pivoting of the slider relative to the rail about a rotational axis (wherein the slider is in its base position, i.e. not rotationally offset around the rotational axis) according to the representative embodiment.
Figure 6:
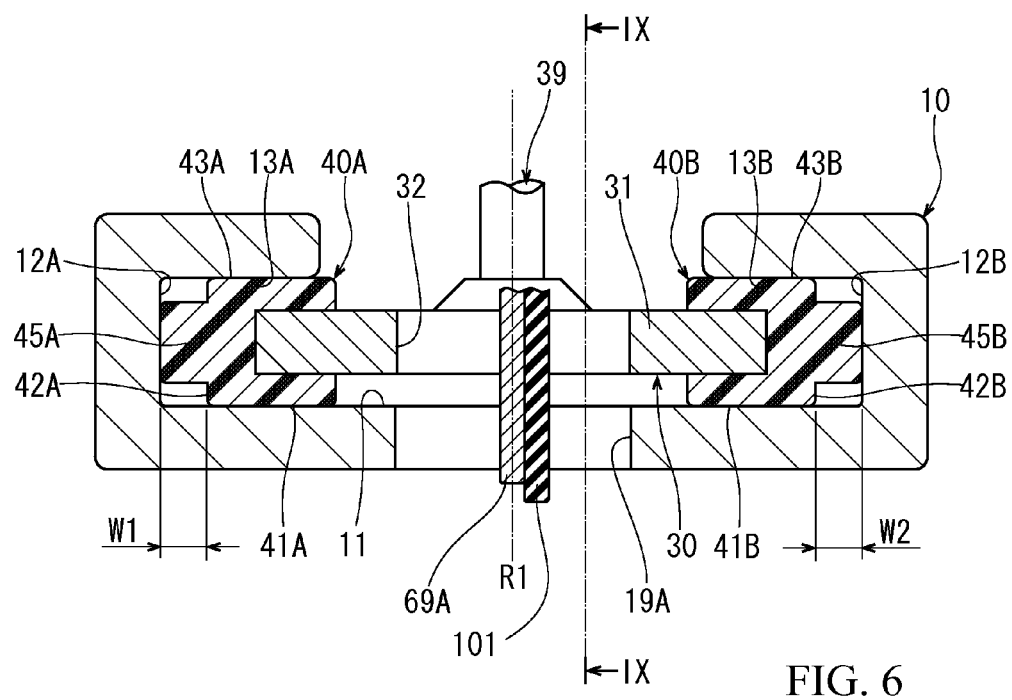
FIG. 6 is a sectional view showing the section along VI-VI in FIG. 5 according to the representative embodiment.

As shown in FIGS. 3 to 5, five latch holes (latch engaging devices) 19A, 19B, 19C, 19D and 19E penetrate through the first guide surface 11 of the rail 10 and extend along the central axial line S1. The latch holes 19A to 19E have a rectangular shape that is longer in the width direction of the first guide surface 11. As will be further described below with reference to FIG. 14, middle portions of a first side 191 and a second side 192 of each latch hole 19A-19E are closer to each other along the central axial line S1 than the end portions of the first and second sides 191, 192.

As shown in FIGS. 4 to 7, the slider 30 comprises a slider main body 31 and a pair of sliding layers (edges) 40A, 40B.

Figure 14:
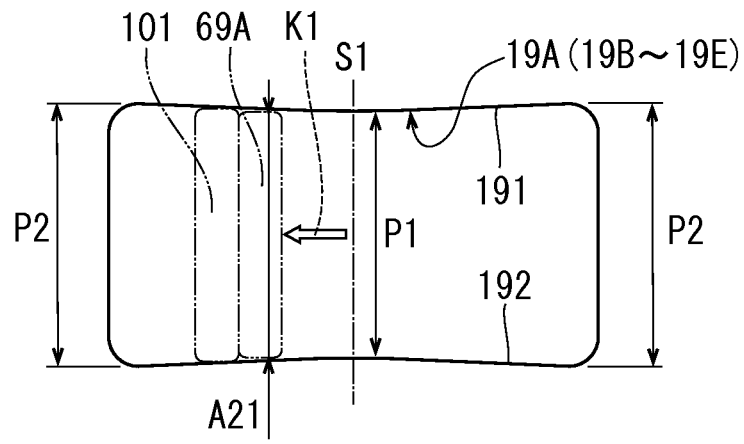
FIG. 14 is a top view for explaining a preferred shape of the latch holes and the relative positional relationship between the latch claw and the latch hole according to the vehicle seat reclining device of the representative embodiment.
Figure 15:
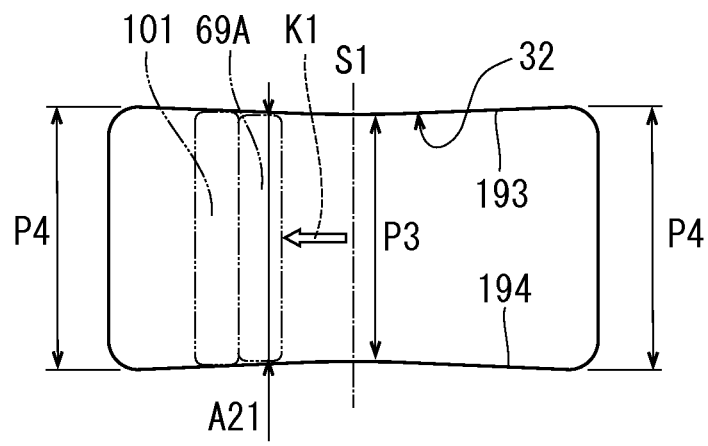
FIG. 15 is a top view for explaining a preferred shape of the slider hole and the relative positional relationship between the latch claw and the slider hole according to the vehicle seat reclining device of the representative embodiment.

Referring to FIG. 4, the slider main body 31 may be formed by punch-pressing a metallic steel plate and has a rectangular shape that is longer in the direction of the central axial line S1. Two post holes 31A, 31B penetrate through a forward portion of the slider main body 31. On the other side, a slider hole 32 penetrates through a rearward portion of the slider main body 31. A pair of outwardly-projecting boss portions 33A, 33B are disposed on the forward and rearward sides of the slider hole 32, respectively. The slider hole 32 has a rectangular shape that is longer in the width direction of the slider main body 31. In this respect, as will be further described below with reference to FIG. 15, a third side 193 and a fourth side 194 are bent to come closer to each other on the central axial line S1. As shown in FIGS. 5, 14 and 15, the shape and the size of the slider hole 32 are substantially identical to those of the respective latch holes 19A to 19E.

As shown in FIG. 2, a striker 39 is affixed to the slider main body 31. Referring to FIG. 4, the striker 39 may be formed by bending a metallic round bar so as to have a substantially "U" shape. The striker 39 is fixedly connected to the slider main body 31 by inserting its front end portion 39A and rear end portion 39B through the respective post holes 31A, 31B and then welding or heat crimping. A portion of the front end portion 39A of the striker 39 is inserted into the above-mentioned recessed opening 91 of the locking device 90 in order to engage with the locking device 90.

Figure 7:
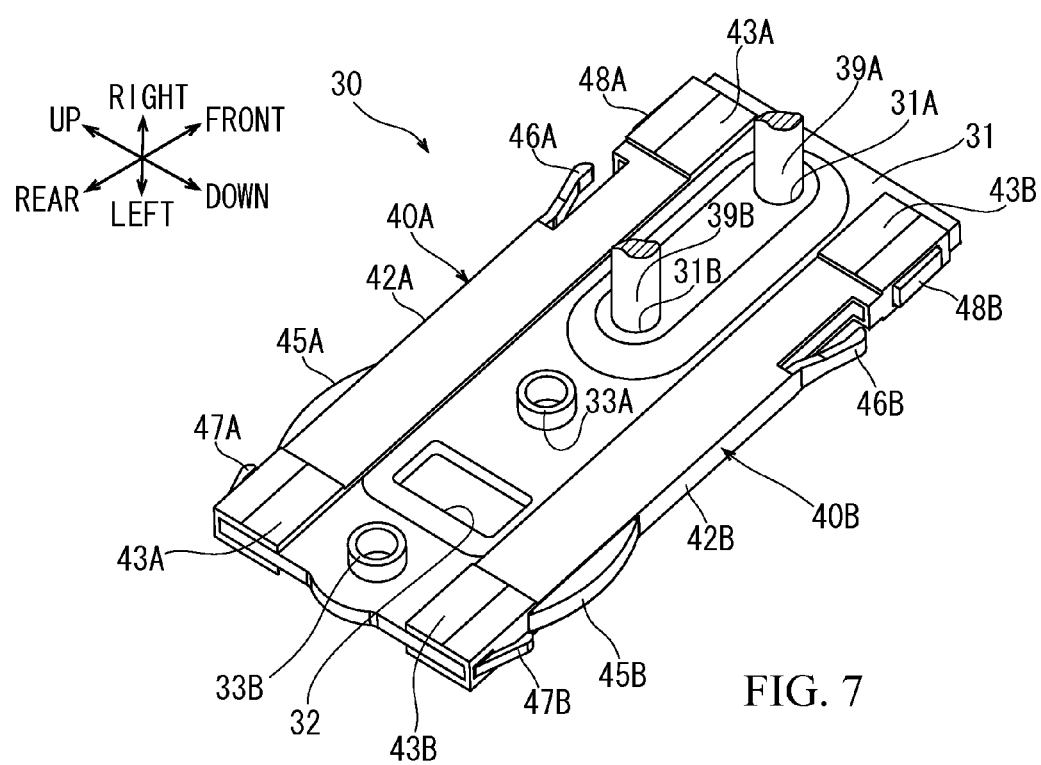
FIG. 7 is a perspective view of the slider according to the representative embodiment.

As shown in FIGS. 4, 6 and 7, the sliding layers 40A, 40B are resin members that respectively surround an upper edge and a lower edge of the slider main body 31 in a substantially "C" shape. After the striker 39 has been affixed to the slider main body 31, the respective sliding layers 40A, 40B are integrated with the slider main body 31 by setting the slider main body 31 into an injection molding die and then injection molding the layers or edges 40A, 40B using a thermoplastic resin. Suitable examples of a resin for forming the two sliding layers 40A, 40B include resin materials exhibiting excellent wear-resistance and/or excellent sliding properties (for instance, POM (polyacetal) resin, PA (polyamide, e.g., nylon) resin, etc.).

As shown in FIG. 6, the slider 30 is housed in the rail 10. In the following description, the surfaces of the respective sliding layers 40A, 40B that face the first guide surface 11 will be called "first guided surfaces" 41A, 41B, the pair of surfaces that face the respective second guide surfaces 12A, 12B will be called "second guided surfaces" 42A, 42B, and the pair of surfaces that face the respective third guide surfaces 13A, 13B will be called "third guided surfaces" 43A, 43B.

The first guided surfaces 41A, 41B and the third guided surfaces 43A, 43B are formed with high precision based on the inner cavity shape of the injection molding die. Consequently, the first guide surface 11 can slidably contact the first guided surfaces 41A, 41B without rattling, and the third guide surfaces 13A, 13B can also slidably contact the third guided surfaces 43A, 43B without rattling. On the other hand, clearances W1, W2 in the width direction (the horizontal direction in FIG. 6) are provided between the second guide surfaces 12A, 12B and the second guided surfaces 42A, 42B, respectively. It is noted that rotatable (rounded) portions 45A, 45B, which outwardly project from the respective second guided surfaces 42A, 42B in the width direction and rotatably or slidably contact the second guide surfaces 12A, 12B, respectively, will be further described below. The thus arranged slider 30 is slidable along the central axial line S1 of the rail 10. The striker 39 is movable with the slider 30 along the central axial line S1 such that it projects outwardly from the rail 10 from the portion of the slider main body 31 that is disposed between the third guide surfaces 13A, 13B.

As shown in FIGS. 2, 3 and 4, a support portion 61 is fixedly attached to the slider main body 31. The support portion 61 may be formed by punch pressing a metallic steel plate, and is configured to cover the slider hole 32. The support portion 61A has a pair of flanges that project from the side walls in the forward and rearward directions and are attached to the slider main body 31 by crimp fastening the boss portions 33A, 33B.

Figure 8:
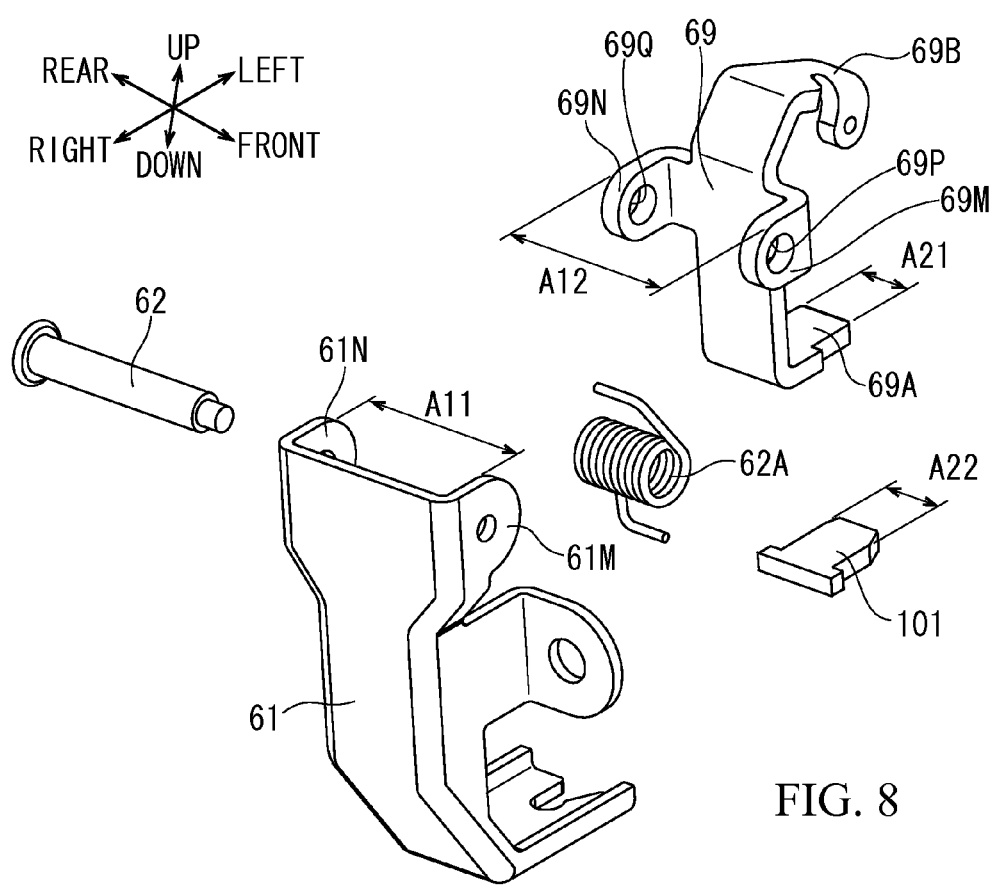
FIG. 8 is an exploded perspective view showing a support portion, a pivot shaft, a lever and a dampener in enlarged form according to the vehicle seat reclining device of the representative embodiment.
Figure 9:
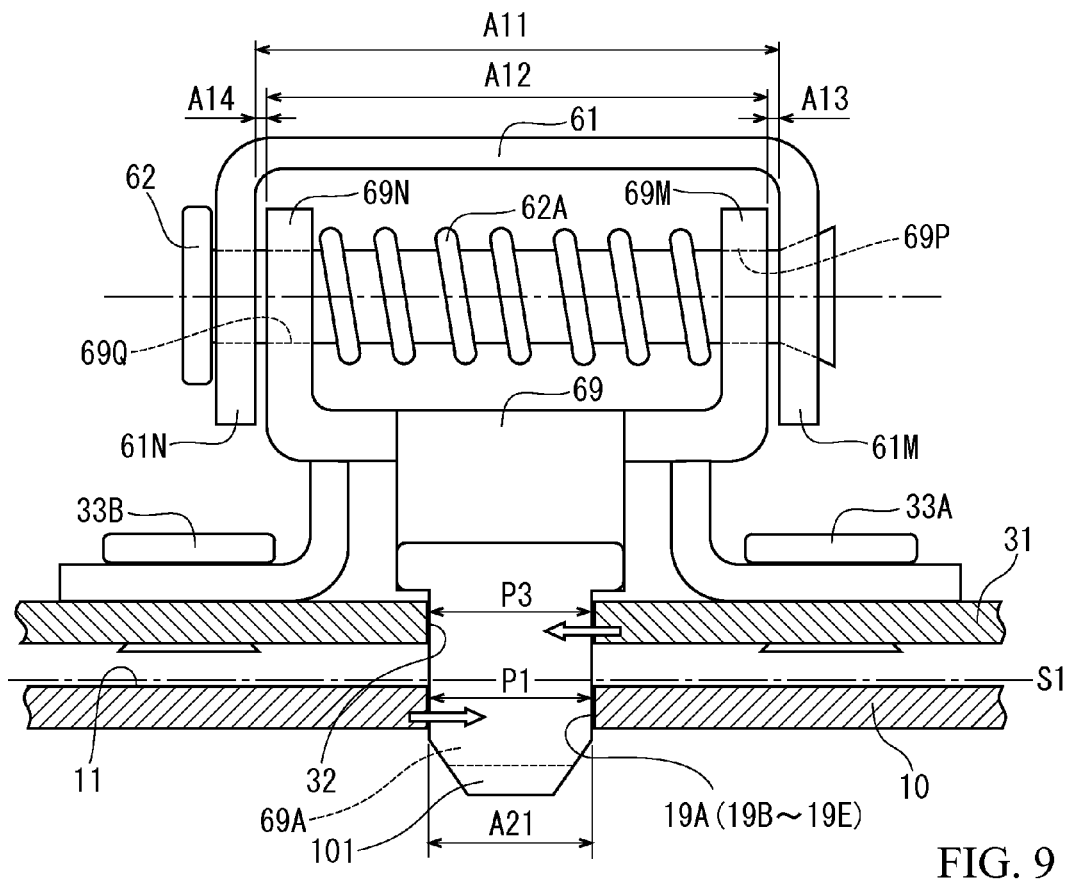
FIG. 9 shows a longitudinal cross-section view along line IX-IX indicated in FIG. 6 through the vehicle seat reclining device of the representative embodiment.

As shown in FIGS. 8 and 9, a pair of flanges 61M, 61N are formed on an upper end side of the support portion 61. The flanges 61M, 61N are bent so as to have a substantially "U" shape and project towards the slider main body 31. A pivot shaft 62 is supported at both ends by the respective flanges 61M, 61N and is retained in a position parallel to the central axial line S1. A torsion coil spring 62A is fitted around the pivot shaft 62.

The support portion 61 supports the lever 69 so as to be pivotable about the pivot shaft 62. More particularly, the lever 69 may be formed by punch pressing a metallic steel plate and includes a pair of flanges 69M, 69N. The flanges 69M, 69N project perpendicularly (in the width direction) from an intermediate portion of the lever 69 and are bent so as to have a substantially "U" shape. Shaft holes 69P, 69Q penetrate through the flanges 69M, 69N. The lever 69 is supported on the support portion 61 by inserting the pivot shaft 62 through the shaft holes 69P, 69Q (and the shaft holes in the flanges 61M, 61N) such that the flanges 69M, 69N are disposed between the flanges 61M, 61N. Thus, the clearance or distance A11 between the facing inner wall surfaces of the respective flanges 61M, 61N is larger than the clearance or distance A12 between the outer wall surfaces of the respective flanges 69M, 69N. In other words, a first amount of play (space) equal to the difference (A11–A12) is provided between the support portion 61 and the lever 69 in a direction parallel to the central axial line S1, i.e. in a lateral direction of the lever 69 and the support portion 61. Preferably, the first amount of play (A11–A12) is within the range of about 0.1 mm to 4.0 mm. More preferably, the first amount of play (A11–A12) is within the range of about 0.2 mm to 2.0 mm.

As shown in FIGS. 8 and 9, the lever 69 includes a latch claw 69A and an input portion 69B. The latch claw 69A extends downward from the pivot shaft 62 and bends to the left, and the input portion 69B extends upwards from the pivot shaft 62 and also bends to the left. The torsion coil spring 62A biases the lever 69 such that the latch claw 69A is urged towards the first guide surface 11 of the rail 10. The width A21 of the latch claw 69A in the (lateral) direction parallel to the central axial line S1 is slightly smaller or less than the clearance P1 of the latch holes 19A to 19E in the (lateral) direction parallel to the central axial line S1 (see FIGS. 9 and 14). The width A21 of the latch claw 69A in the direction parallel to the central axial line S1 is also slightly smaller or less than the clearance P3 of the slider hole 32 in the direction parallel to the central axial line S1 (see FIGS. 9 and 15). In other words, a second amount of play (space) equal to the difference (P3–A21) is provided between the slider hole 32 and the latch claw 69A in the direction parallel to the central axial line S1. In this embodiment, the second amount of play or space (P3–A21) is preferably smaller or less than the first amount of play (A11–A12). Preferably, the second amount of play (P3–A21) is within the range of about 0.05 mm to 1.0 mm and is smaller or less than the first amount of play or space (A11–A12). More preferably, the second amount of play (P3–A21) is within the range of about 0.1 mm to 0.5 mm and is smaller or less than the first amount of play (A11–A12). With this configuration, the latch claw 69A is capable of displacing in the direction parallel to the central axial line S1 within the range of the second amount of play (P3–A21) while the latch claw 69A is advancing or being moved into the slider hole 32. Furthermore, the lever 69 is also capable of displacing in the direction parallel to the central axial line S1 along the pivot shaft 62 within the range of the first amount of play (A11–A12). However, since the second amount of play (P3–A21) is smaller or less than the first amount of play (A11–A12), the lever 69 is prevented from abutting against or being forcibly pressed against the support portion 61 in the direction parallel to the central axial line S1. As is apparent from FIG. 9, a third amount of play (space) (P1–A21) exists between the latch hole 19A and the latch claw 69A and is at least substantially equal to the second amount of play.

During manufacturing, the sizes or dimensions of support portion 61 and the lever 69 are preferably set such that the second amount of play (P3–A21) is definitely smaller or less than the first amount of play (A11–A12), and such that any post-processing dimensional variations or tolerances are within a specified range. Further, as shown in FIG. 9, during the design process, the position of the lever 69 relative to the support portion 61 is preferably set such that, when the latch claw 69A is positioned in the middle of the slider hole 32 in the direction parallel to the central axial line S1, the clearance or distance A13 between facing side surfaces of the flange 61M and the flange 69M is equal to or at least substantially equal (subject to tolerances) to the clearance or distance A14 between facing side surfaces of the flange 61N and the flange 69N. Preferably, the clearances or distances A13, A14 are each within the range of about 0.05 mm to 2.0 mm and are equal to or at least substantially equal to each other. More preferably, the clearances or distances A13, A14 are each within the range of 0.1 mm to 1.0 mm and are equal or at least substantially equal to each other.

This configuration enables the latch claw 69A to advance into the interior of the slider hole 32, thereby engaging the latch claw 69A in the slider hole 32, when the latch claw 69A is positioned so as to face or oppose any one of the latch holes 19A to 19E of the rail 10. In this engaged state, the slider 30 is prevented from sliding relative to the rail 10 along the central axial line S1. In this respect, since the tip end of the latch claw 69A has a tapered shape, preferably by chamfering corner portions thereof, it is capable of smoothly advancing into the latch holes 19A to 19E and the slider hole 32. However, it is noted that the lateral edges of the latch claw 69A that are disposed between the lateral peripheral edges of the slider hole 32, when the latch claw 69A is engaged therein, are parallel to each other, thereby providing a reliable engagement, even if an impact force is applied, e.g., due to a sudden braking or a sudden loading on the backrest 7, which might have undesirably disengaged the latch claw 69A from the slider hole 32 in the above-described prior art due to the tapering of the latch claw 69A. Furthermore, this structural configuration enables the distance between facing surfaces of the first guide surface 11 of the rail 10 and the slider main body 31 to be shortened or reduced. Therefore, the load applied to the latch claw 69A or the lever 69 can be reduced in such a vehicle seat reclining device 1.

Figure 10:
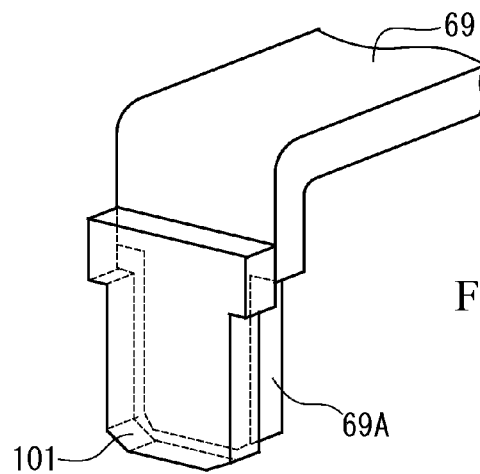
FIG. 10 is a slightly enlarged perspective view showing the dampener affixed to the latch claw according to the vehicle seat reclining device of the representative embodiment.

As shown in FIG. 10, a dampener 101, preferably made of rubber and/or another elastomeric material as will be further described below, may be vulcanized and adhered onto the surface of the latch claw 69A that faces away from the pivot shaft 62. The shape of the dampener 101 is preferably similar to the shape of the latch claw 69A, but the size of the dampener 101 is preferably slightly larger or wider in the direction parallel to the central axial line S1, at least when it is not elastically deformed. As shown in FIG. 8, the width A22 of the dampener 101 in the direction parallel to the central axial line S1 is larger or greater than the width A21 of the latch claw 69A so that the lateral edges of the dampener 101 project beyond the lateral edges of the latch claw 69A when it is not elastically deformed. Preferably, the width A22 of the dampener 101 is larger or greater than the width A21 of the latch claw 69A by about 0.05 mm to 3.0 mm. More preferably, the width A22 of the dampener 101 is larger or greater than the width A21 of the latch claw 69A by about 0.1 mm to 1.5 mm. More particularly, as shown in FIG. 9, when the latch claw 69A advances into one of the latch holes 19A to 19E with the slider hole 32 being interposed therebetween, the dampener 101 projects from the lateral edges of the latch claw 69A and abuts against the lateral edges of both the slider hole 32 and the engaged latch hole 19A to 19E while undergoing elastic deformation, prior to the latch claw 69A contacting the slider hole 32 and/or the engaged latch hole 19A to 19E. (FIG. 9 shows the state where the dampener 101 is squeezed and deformed in the width direction.) In this respect, the tip end of the dampener 101 has also a tapered shape similar to the latch claw 69A with its corner portions being chamfered so that it can smoothly advance into the respective latch hole 19A to 19E and the slider hole 32.

As shown in FIG. 3, one end of a transmission cable 65 is connected to the input portion 69B. While not shown in the drawings, an adjusting lever for adjusting the tilted position of the backrest 7 is provided in the vicinity of the vehicle seat 8, and the other end of the transmission cable 65 is connected to the adjusting lever. When the passenger operates the adjusting lever in order to adjust the tilted position of the backrest 7, the movement of the adjusting lever is transmitted to the input portion 69B via the transmission cable 65. Therefore, the input portion 69B will be pulled downward as shown in FIG. 3. This will cause the lever 69 to pivot about the pivot shaft 62 against the biasing force of the torsion coil spring 62A and cause the latch claw 69A to retract or move away from the first guide surface 11 of the rail 10. Thus, the latch claw 69A will disengage from the respective latch holes 19A to 19E and the slider 30 will be permitted to slide relative to the rail 10 along the central axial line S1.

Figure 11:
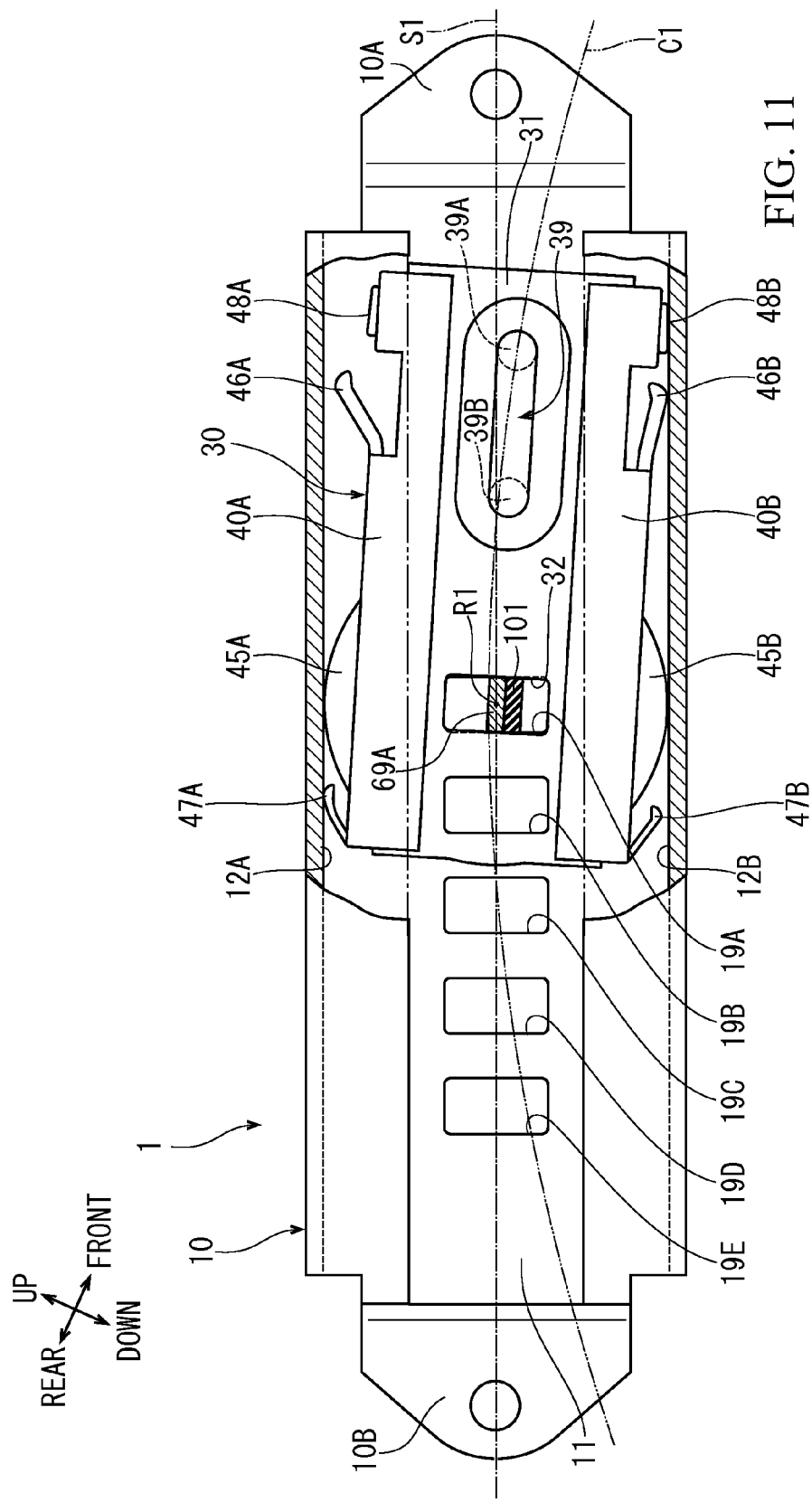
FIG. 11 is a side view (partial sectional view) for explaining the rotation of the slider relative to the rail around the rotational axis (wherein the slider is rotationally offset from its base position) according to the vehicle seat reclining device of the representative embodiment.

In FIGS. 5 and 11, the latch claw 69A is engaged in the latch hole 19A and the striker 39 is disposed at its forwardmost position. While not shown in the drawings, when the latch claw 69A is positioned to permit engagement with the latch hole 19E, the striker 39 will be disposed at its rearwardmost position.

In a preferred aspect of the present teachings, the latch mechanism 60 may comprise one lever 69 having one latch claw 69A and five latch holes 19A to 19E. As will be further discussed in the following, a rotational axis R1 may be defined or fall within in a central portion of the latch claw 69A when the latch claw 69A is engaged with any one of the latch holes 19A to 19E as shown in FIGS. 3, 5, 6 and 11.

As shown in FIGS. 5 to 7 and 11, a pair of rotatable (rounded) portions 45A, 45B respectively project radially relative to the rotational axis R1 and are integrally formed with the respective sliding layers 40A, 40B. The rotatable portions 45A, 45B form a portion of an overall cylindrical-shaped surface whose center is the rotational axis R1 and whose radius equals the distance between the rotatable axis R1 and the respective second guide surfaces 12A, 12B (i.e. one half of the distance between the two second guide surfaces 12A, 12B). Accordingly, the rotatable portions 45A, 45B narrow or even eliminate the clearances W1, W2 between the respective second guide surfaces 12A, 12B and the respective guided surfaces. Preferably, when the slider 30 pivots about the rotational axis R1 away from a base or original rotational position where a longitudinal axis of the slider 30 is aligned with the central axial line S1 (i.e. the position shown in FIG. 5), the respective rotatable portions 45A, 45B will be constantly in sliding contact with the second guide surfaces 12A, 12B. As a result, the slider 30 will pivot about the rotational axis R1 without any positional displacement of the slider 30 relative to the rail 10 in the width direction. At this time, as shown in FIGS. 5 and 11, the dampener 101 will not prevent the above-described rotational movements since it can elastically deform while continuously abutting against the respective latch hole 19A to 19E and the slider hole 32.

A pair of stopper portions 48A, 48B project outwardly from the forward end portion of the sliding layers 40A, 40B and face the respective second guide surfaces 12A, 12B. The pivotable range of the slider 30 about the rotational axis R1 is limited by the stopper portion 48A abutting the second guide surface 12A on the one side and the stopper portion 48B abutting the second guide surface 12B on the other side (the state shown in FIG. 11).

A pair of biasing (spring) portions 46A, 46B are integrally formed on the sliding layers 40A, 40B respectively, between the rotatable portions 45A, 45B and the stopper portions 48A, 48B. A pair of biasing portions 47A, 47B are also integrally formed on the rearward-end portion of the sliding layers 40A, 40B, respectively. The respective biasing portions 46A, 46B, 47A, 47B project outwardly and obliquely from the respective sliding layers 40A, 40B in the width direction. Each biasing portion 46A, 46B, 47A, 47B is in contact with the respective second guide surface 12A, 12B across the respective clearances W1, W2 in the width direction and is elastically deformed.

When the forward end portion 39A of the striker 39 is not in engagement with the locking device 90, the slider 30 is not rotatably offset around the rotational axis R1, i.e. it is in its base or original rotational position. Further, the striker 39 is positioned so as to be aligned with the central axial line S1 as shown in FIG. 5.

On the other hand, as shown in FIG. 11, when the forward end portion 39A of the striker 39 is engaged with the locking device 90 at a position where the central axial line S1 is upwardly shifted relative to the arc or curved path C1, a moment acts that causes the striker 39 to pivot clockwise about the rotational axis R1. This causes the slider 30 to pivot about the rotational axis R1 and thus absorb the displacement or deviation between the arc or curved path C1 and the central axial line S1. At this time, the biasing portion 46B is firmly pressed against the second guide surface 12B and is thus further elastically deformed. The biasing portion 47A is also firmly pressed against the second guide surface 12A and is thus further elastically deformed. As a result, a restoring force generated by the biasing portions 46B, 47A will act on the slider 30 to urge the slider 30 to return to its original position by pivoting back about the rotational axis R1. Therefore, the slider 30 can easily return to its original position relative to rotational axis R1 in cases in which the forward end portion 39A of the striker 39 is not engaging with the locking device 90 or the slider 30 is moved rearward.

While not shown in the drawings, when the slider 30 pivots about the rotational axis R1 relative to the rail 10 in a direction opposite to the above direction (e.g., counterclockwise), the biasing portions 46A, 47B will urge the slider 30 to return to its original position by pivoting back about the rotational axis R1.

Effect and advantages of the above-described embodiment of the vehicle seat reclining device 1 will now be explained. As was discussed above, the first amount of play (A11–A12) is provided between the support portion 61 and the lever 69 in a direction parallel to the central axial line S1, and the second amount of play (P3–A21), which is smaller or less than the first amount of play (A11–A12), is provided between the slider hole 32 and the latch claw 69A in the same direction that is parallel to the central axial line S1. Accordingly, when a load is applied to the backrest 7 that is fixed at a tilted position, the load is first transmitted from the locking device 90 to the striker 39 and the slider 30 and then from the slider hole 32 and the latch claw 69A to the engaged latch hole 19A to 19E, as shown by the leftward-pointing arrow in FIG. 9. Consequently, the rail 10 will ultimately support this load. In other words, the load is not transmitted from the slider 30 to the latch claw 69A via the support portion 61 and the lever 69 as in the above-described known art, but rather from the slider 30 to the latch claw 69A via the slider hole 32. At this time, a reaction force from the latch hole 19A to 19E, which is engaging the latch claw 69A, acts on the latch claw 69A in the direction parallel to the central axial line S1, as shown by the rightward-pointing arrow in FIG. 9. As a result, the lever 69 having the latch claw 69A is displaced due to this reaction force in the direction parallel to the central axial line S1. However, since the second amount of play (P3–A21) is smaller than the first amount of play (A11–A12), the latch claw 69A of the lever 69 abuts against the slider hole 32 before the lever 69 abuts against the support portion 61. Therefore, the slider hole 32 supports the reaction force instead of the support portion 61. Consequently, it is not necessary to design the support portion 61 as a strong or robust structure for supporting the reaction force, i.e. as a structure that may significantly increase overall weight as well as manufacturing costs.

The vehicle seat reclining device 1 of the present embodiment is thus capable of realizing a weight savings and a reduction in manufacturing costs.

As was noted above, the vehicle seat reclining device 1 is configured such that the slider hole 32, which is proximal to the latch claw 69A, supports the reaction force. This design makes it possible to restrict the displacement of the entire lever 69 when the reaction force is acting upon it. Furthermore, this design differs from the above-described known art, in which the support portion 61, which is spaced from the latch claw 69A, supports the reaction force. It is therefore possible to reduce the inertial force acting on the lever 69 even when an impact load acts on the backrest 7 due to a sudden braking or a sudden loading applied to the backrest 7. Consequently, it is possible to prevent the defect that the latch claw 69A undesirably disengages from the latch hole when the lever 69 pivots due to the inertial force, i.e. even though the lever 69 is not being operated by a passenger.

The vehicle seat reclining device 1 is also configured such that the dampener 101 is affixed to the latch claw 69A. When the latch claw 69A advances towards the rail 10, the dampener 101 projecting from the edges of the latch claw 69A abuts against the slider hole 32 and the respective latch hole 19A to 19E while undergoing elastically deformation, prior to the latch claw 69A contacting the slider hole 32 and the respective latch hole 19A to 19E. Therefore, the latch claw 69A does not abut against the slider 32 or the latch hole 19A to 19E, thereby minimizing or preventing noise generation.

This embodiment provides the advantage that a relatively-wide adhesion area is provided by vulcanizing and adhering the elastomeric dampener 101 to the latch claw 69A. Therefore, the dampener 101 will resist being peeled off from the latch claw 69A during normal operation, thereby increasing durability.

Since the vehicle seat reclining device 1 of this embodiment employs a linearly extending (straight) rail 10 and a slider 30 that slides along the straight rail 10, it is possible to reduce manufacturing costs as compared to an embodiment that employs a curved or arched rail and a slider that slides along the curved or arched rail.

However, when the slider 30 slides along the straight rail 10 due to the backrest 7 being tilted, the locking device 90 will trace an arched or curved path C1 while the slider 30 traces a linear path along the central axial line S1. This causes a displacement or deviation between the two paths.

In view of this point, the clearances W1, W2 in the width direction, which is orthogonal to the rotational axis R1 and is also orthogonal to the central axial line S1, are provided between the rail 10 and the slider 30 in the present vehicle seat reclining device 1. The slider 30 further includes the pair of rotatable portions 45A, 45B. These rotatable portions 45A, 45B eliminate the clearances W1, W2 in the width direction and guide the rotation of the slider 30 relative to the rail 10 around the rotational axis R1 by maintaining sliding contact with the lateral edge of the rail 10. Since the striker 39 is affixed to the slider 30 and can also rotate around the rotational axis R1, it is possible to absorb the displacement or deviation between the respective paths of movement of the locking device 90 and the striker 39. Also, even in case there is a positional displacement of the locking device 90 mounted to the backrest 7 relative to the striker 39 mounted to the vehicle body 9, such positional displacements can be absorbed, which renders adjustments after mounting unnecessary. Further, since the rotatable portions 45A, 45B eliminate the respective clearances W1, W2 between the rail 10 and the slider 30 in the width direction, there will be no positional displacement of the slider 30 relative to the rail 10 in the width direction. Therefore, this structural configuration can further reduce or even eliminate rattling and/or noise generation as the slider 30 slides along the rail 10. Moreover, since the striker 39 is affixed to the slider 30, it is easier to firmly attach the striker 39 to the slider 30. Accordingly, rattling or noise generation rarely occur in the area of the striker 39 or the slider 30 as the slider 30 slides along the rail 10.

Further, while such rotating movement might apply a twisting force to the latch claw 69A and the lever 69, such twisting force is also supported by the slider hole 32 proximal to the latch claw 69A. Therefore, a large load is not likely to act on the support portion 61. Accordingly, in the vehicle seat reclining device 1, the support portion 61 is not required to have a strong or robust structure, such that reductions in weight and manufacturing costs may be realized without affecting reliability or durability.

Figure 12:
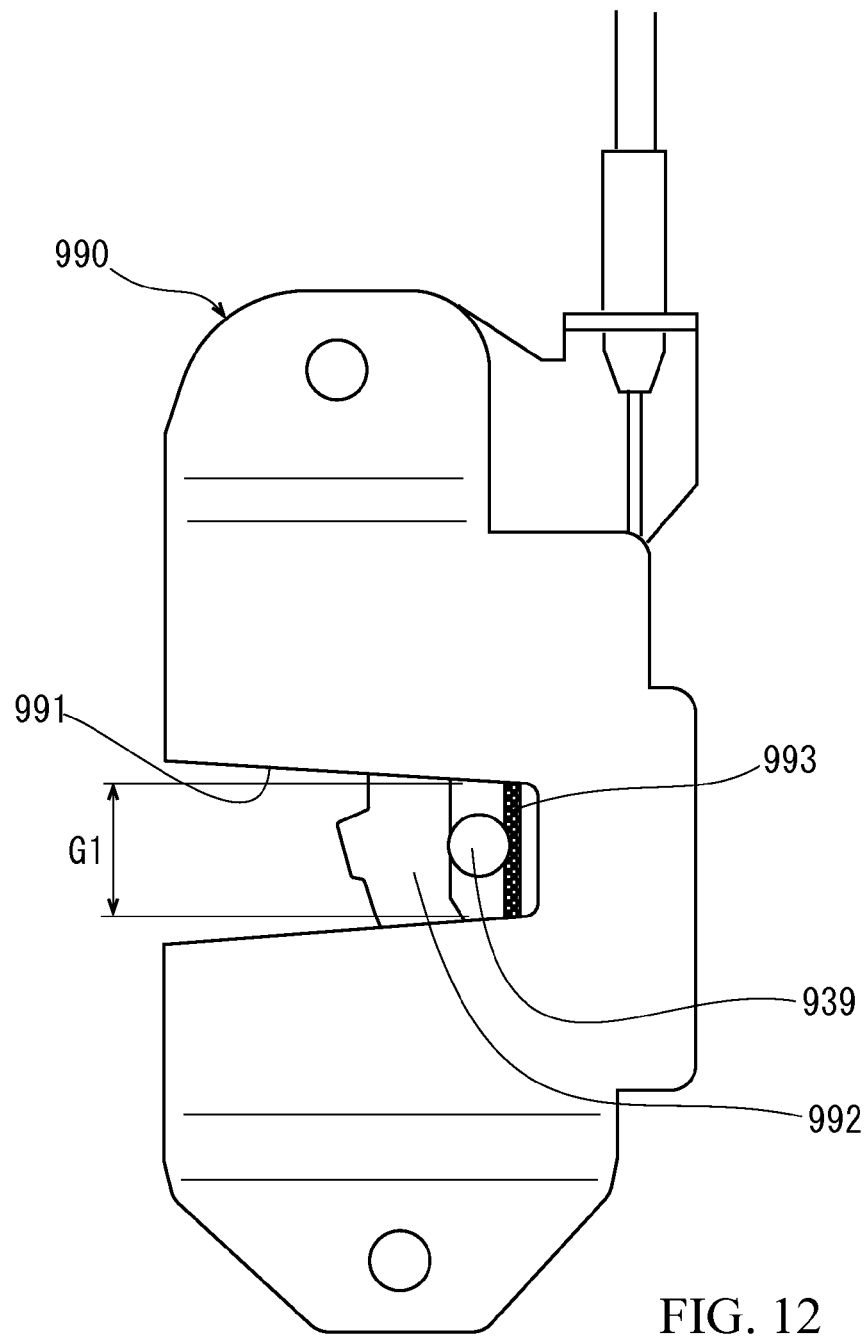
FIG. 12 is a schematic view for explaining a known locking device.

Such a structural configuration of the vehicle seat reclining device 1 enables a smooth tilting of the backrest 7. In addition, the mouth of the recessed opening 91 of the locking device 90, which engages with the striker 39 of the vehicle seat reclining device 1 according to this embodiment (see FIG. 1), can be made narrower than the mouth G1 of a recessed opening 991 of a conventional locking device 990 as shown in FIG. 12. In the conventional locking device 990, a fork 992 and a damper 993 made of rubber or an elastomer are also relatively long in order to correspond to the relatively wide mouth G1, so that meshing positions of the fork 992 and the damper 993 relative to a striker 939 will vary. This will cause variations in the meshing strength between the locking device 990 and the striker 939, so that it will be difficult to increase the meshing strength. Moreover, since the striker 939 moves between the fork 992 and the damper 993 with the striker 939 biting or digging into the damper 993, a smooth tilting of the backrest tends to be inhibited. In contrast, the present locking device 90, which is engaged with the striker 39 of the vehicle seat reclining device 1 according to the present embodiment, enables the fork and the damper to be shortened, so that the meshing positions of the fork and the damper relative to the striker 39 barely vary. Accordingly, the meshing strength between the locking device 90 and the striker 39 will barely vary, and it becomes easy to increase the meshing strength. Further, since the striker 39 will not move between the fork and the damper while the striker 39 is biting or digging into the damper when reclining the backrest, a smooth tilting of the backrest 7 is not prevented.

Moreover, in the present vehicle seat reclining device 1, when the slider 30 is in its original or base rotational position (i.e. it is not rotated relative to the rail 10 around the rotational axis R1), the striker 39 is located on or aligned with the central axial line S1. The engaging position between the locking device 90 and the striker 39 and the engaging position between the latch claw 69A and the latch holes 19A to 19E can be located more easily on the central axial line S1. This reduces the moment that could cause the slider 30 to rotate relative to the rail 10 around the rotational axis R1. Consequently, the load acting on the rotatable portions 45A, 45B of the slider 30 can be reduced, which will thereby improve durability. Further, as shown, e.g., in FIG. 5, the rail 10, the slider 30 and the striker 39 are configured or designed to be line or mirror symmetric with respect to the central axial liner S1 serving as the reference line. Accordingly, the rail 10, the slider 30 and the striker 39 can be commonly used for both the left-hand side and the right-hand side of the vehicle body 9. Therefore, this configuration realizes further manufacturing cost reductions.

Figure 13:
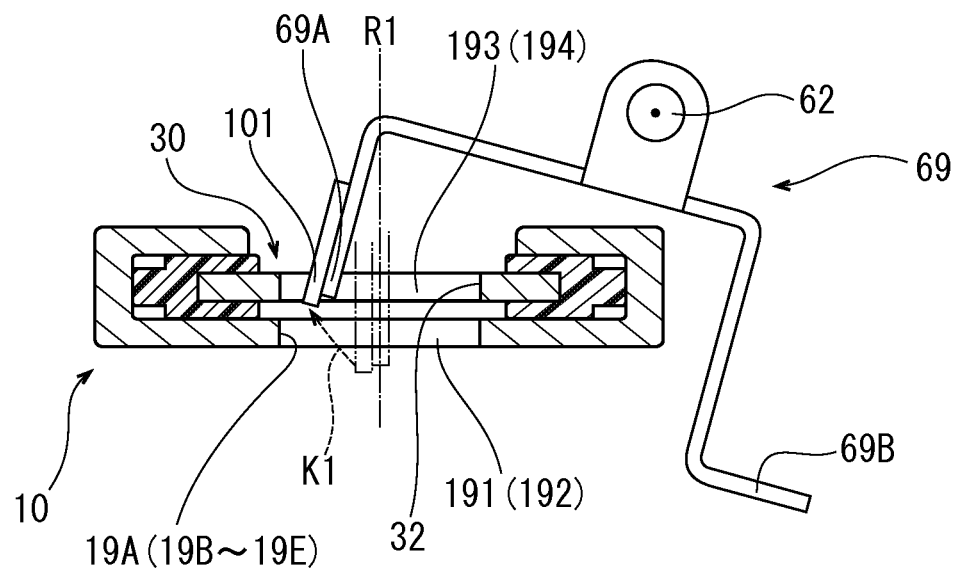
FIG. 13 is a cross-sectional view showing a path of movement when the latch claw retracts from the rail according to the vehicle seat reclining device of the representative embodiment.

Furthermore, in the vehicle seat reclining device 1, the pivot shaft 62 is parallel to the central axial line S1 as shown in FIGS. 3, 9 and 13. As is further shown in FIG. 14, each of the latch holes 19A to 19E has a first side 191 and a second side 192. The first side 191 is orthogonal to the central axial line S1 and extends in the directions away from the central axial line S1. The second side 192 is also orthogonal to the central axial line S1 and faces or opposes the first side 191. A clearance P1 between the first side 191 and the second side 192 along the central axial line S1 is preferably selected such that it provides a very small or no clearance relative to the width A21 of the latch claw 69A as mentioned above. Therefore, when the latch claw 69 engages in a particular latch hole 19A to 19E, the first side 191 and the second side 192 pinch or bound the latch claw 69A therebetween along the central axial line S1. The clearance between the first side 191 and the second side 192 preferably gradually increases above and below the central axial line S1 to wider clearance P2, i.e. in the direction that the latch claw 69A moves away from the central axial line S1 along the path K1 that is traced when the latch claw 69A is retracted or disengaged from the rail 10 (clearance P2>clearance P1). In this respect, while the difference between the sizes of clearance P2 and clearance P1 is illustrated in an exaggerated manner in FIG. 14 (i.e. not to scale), an actual difference of about several tenths of a millimeter to 2 mm will usually be sufficient.

Moreover, as shown in FIG. 15, the slider hole 32 has a third side 193 and a fourth side 194. The third side 193 is orthogonal to the central axial line S1 and extends in the direction away from the central axial line S1. The fourth side 194 is also orthogonal to the central axial line S1 and faces or opposes the third side 193. As mentioned above, a clearance P3 between the third side 193 and the fourth side 194 along the central axial line S1 is preferably selected so as to provide a very small clearance relative to the width A21 of the latch claw 69A (i.e. a second amount of play (P3−A21) is provided between the slider hole 32 and the latch claw 69A). With this configuration, when the latch claw 69 engages in the slider hole 32, the third side 193 and the fourth side 194 pinch or bound the latch claw 69A therebetween along the central axial line S1. Further, the clearance between the third side 193 and the fourth side 194 preferably gradually increases above and below the central axial line S1 to wider clearance P4, i.e. in the direction that the latch claw 69A moves away from the central axial line S1 along the path K1 that is traced when the latch claw 69A is retracted or disengaged from the rail 10 (clearance P4>clearance P3). In this respect, while the difference between the sizes of clearance P4 and clearance P3 is illustrated in an exaggerated manner in FIG. 15 (i.e. not to scale), an actual difference of approximately several tenths of a millimeter to 2 mm will usually be sufficient, similar to the difference between the clearance P2 and the clearance P1.

According to the above-described structural configuration, the latch claw 69A moves towards and away from the central axial line S1 while being pinched or bounded between the first side 191 and the second side 192 when the lever 69 pivots about the pivot shaft 62 that is parallel to the central axial line S1, whereby the latch claw 69A engages with or disengages from the respective latch hole 19A to 19E as shown in FIGS. 13 to 15. If the clearance P1 between the first side 191 and the second side 192 along the central axial line S1 has been set in the above-described manner, when the latch claw 69A is disposed on the central axial line S1 and is thus in the engaged state, this configuration will prevent play and rattling between the latch claw 69A and the respective latch hole 19A to 19E. Further, if the clearance P3 between the third side 193 and the fourth side 194 along the central axial line S1 has been set in the above-described manner, this configuration will prevent play and rattling between the latch claw 69A and the slider hole 32. Thus, the slider 30 can be reliably and stably fixed relative to the rail 10 in the engaged state.

On the other hand, when the latch claw 69A is positioned so as to be spaced from the central axial line S1, it is possible to utilize a larger clearance between the first side 191 and the second side 192, as well as the third side 193 and the fourth side 194, relative to the latch claw 69A. In this case, the latch claw 69A can smoothly advance into and retract from the latch holes 19A to 19E and the slider hole 32. As a result, the reclining operation will have a lighter feel, i.e. it will require less exertion by the person operating the seat adjusting lever.

As is further shown in FIGS. 14 and 15, the latch holes 19A to 19E and the slider hole 32 have a shape that is line or mirror symmetric with respect to the central axial line S1 serving as a reference. With this configuration, the rails 10 and the sliders 30 can be commonly used for both the left-hand side and the right-hand side of the vehicle body 9.

While the present invention has been described with reference to one presently preferred embodiment thereof, the present invention is not to be limited to the above-described embodiment, and can also be suitably modified without departing from the scope and spirit of the invention.

For instance, in the vehicle seat reclining device 1 of the present embodiment, instead of the dampener 101, a modified dampener 102 may be fastened to the latch claw 69A by crimping or riveting, as shown in FIGS. 16a and 16b. More particularly, as shown in FIG. 16a, the dampener 102 may be made of an annular rubber or elastomeric material, whose outer diameter is equal to the width A22 of the dampener 101. A rivet hole 102A penetrates through the center of the latch claw 69A. The dampener 102 abuts against the surface of the latch claw 69A that faces the pivot shaft 62 and a rivet 102B is inserted through the rivet hole 102A via the center hole of the dampener 102. By crimping or deforming the inserted end of the rivet 102B as shown in FIG. 16b, the dampener 102 is affixed to the claw 69A while being pressed against the latch claw 69A. This configuration also exhibits the same properties and effects as those of the dampener 101, and achieves a simplification of the manufacturing process.

In addition, as shown in FIGS. 17a and 17b, another modified dampener 103 may be screw fastened to the latch claw 69A. More particularly, the dampener 103 may also be made of an annular rubber or elastomeric material, whose outer diameter is equal to the width A22 of the dampener 101. A through hole 103A penetrates through the center of the latch claw 69A. The dampener 103 abuts against the surface of the latch claw 69A that faces away from the pivot shaft 62 and a collar 103C is fit into the center hole of the dampener 103. A tapping screw 103B is then screwed into the through hole 103A via the center holes of the dampener 103 and the collar 103C. Since the tapping screw 103B extends all the way into the through hole 103A and frictionally engages an inner peripheral surface of the through hole 103A, the dampener 103 is affixed and pressed against the latch claw 69A. During the insertion of the tapping screw 103B, the collar 103C protects the dampener 103 from being damaged by the thread of the tapping screw 103B. This configuration also exhibits the same properties and effects as those of the dampeners 101 and 102, and achieves a simplification of the manufacturing process.

Figure 18:
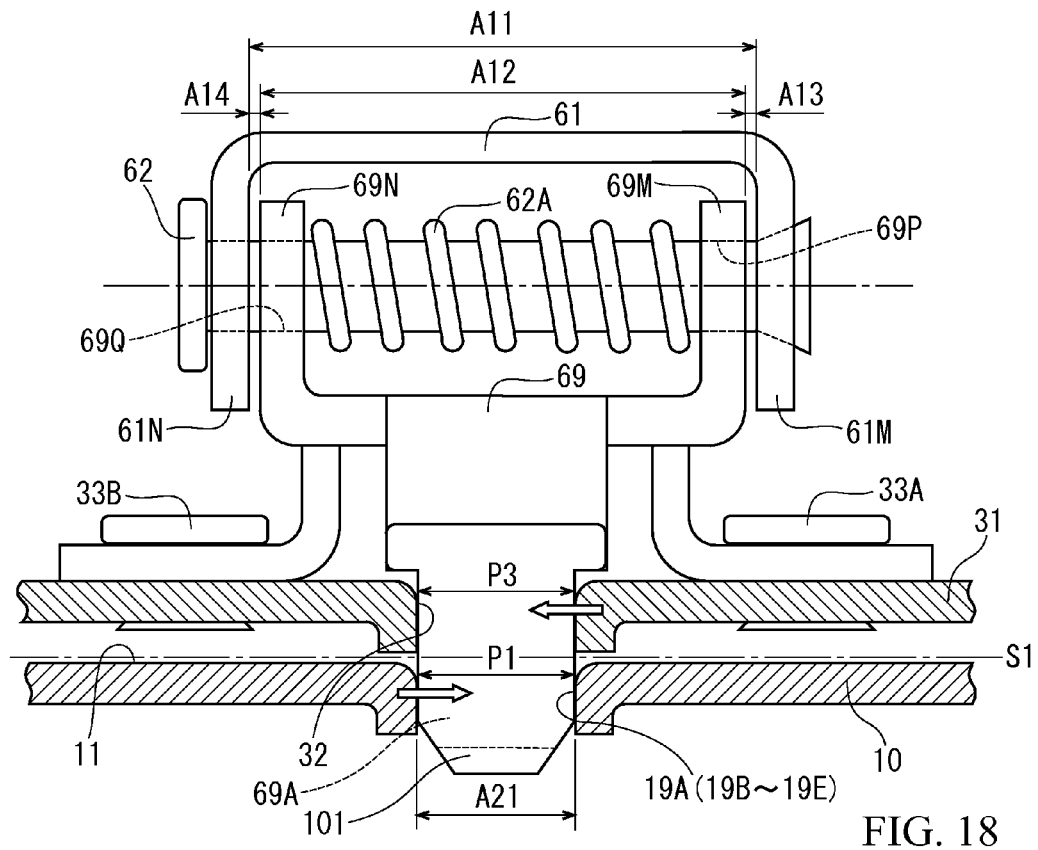
FIG. 18 is a longitudinal cross-sectional view, similar to FIG. 8, but showing a modification of the latch holes and the slider hole.
Figure 19:
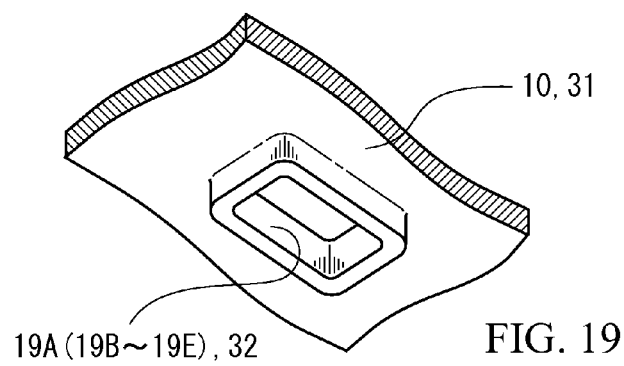
FIG. 19 is a perspective view showing the modification of the latch holes and the slider hole according to FIG. 18.

Another modified example of the above-described preferred embodiment is shown in FIGS. 18 and 19. In this embodiment, when the latch holes 19A to 19E are punched or cut into the first guide surface 11 of the rail 10, burrs or flanges may be formed along the edges of the latch holes 19A to 19E. A representative burr or flange forming process will now be described. That is, a plate material is first punched using a pilot hole punch in order to form pilot holes. Then, a latch hole punch, which is larger than the pilot hole punch, is used to form the latch holes 19A to 19E. During this punching step, peripheral edges of the pilot holes are bent into a curved or tubular shape as shown in FIG. 19. The burr or flange forming process can also be performed in a single step by integrating the pilot hole punch with the latch hole punch.

In the embodiment according to FIGS. 18 and 19, the latch holes 19A to 19E are reinforced by bending the peripheral edges into the curved or tubular shape while also elongating their inner wall surfaces in the depth or thickness direction of the first guide surface 11, which increases the area of the surface that contacts the latch claw 69A. As a result, the latch holes 19A to 19E strongly resist deformation when they engage with the latch claw 69A, and the reaction force from the latch claw 69A is more reliably supported.

As further shown in FIGS. 18 and 19, burrs or flanges may also be formed around the slider hole 32 when the slider hole 32 is punched into the slider main body 31.

In such an embodiment, the slider hole 32 is reinforced by bending the peripheral edges into a tubular or curved shape, while its inner wall surfaces are elongated in the depth or thickness direction of the slider main body 31, thereby increasing the area of the surface that contacts the latch claw 69A. As a result, the slider hole 32 strongly resists deformation when it engages with the latch claw 69A, and the reaction force from the latch claw 69A is more reliably supported.

Figure 20:
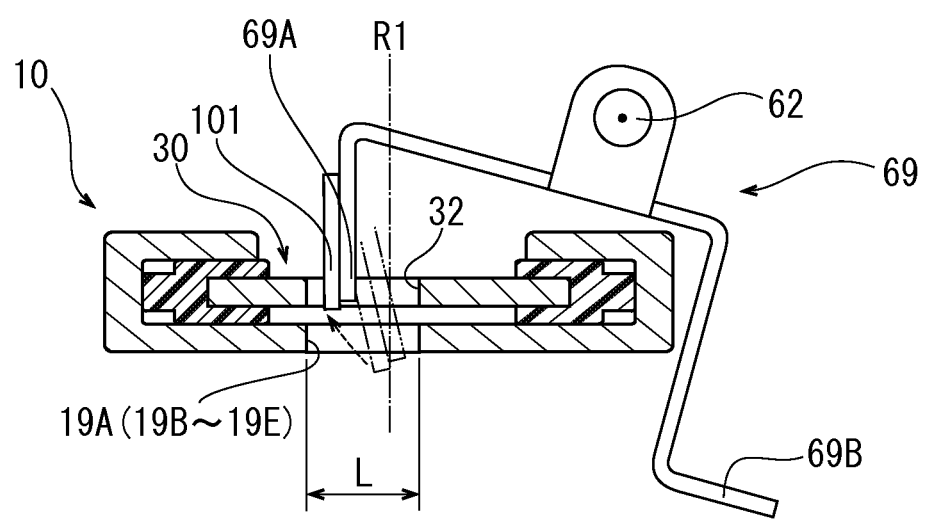
FIG. 20 is a cross-sectional view, similar to FIG. 13, showing a modification of the lever according to the present teachings.

While the latch claw 69A is bent at a substantially right angle relative to the intermediate portion of the lever 69 in FIG. 13, the latch claw 69A may also be bent at an acute angle relative to the intermediate portion of the lever 69 as shown in FIG. 20.

In such an embodiment, the tip end of the latch claw 69A is closer to the pivot shaft 62 than in the embodiment of FIG. 13. Therefore, this configuration reduces the range of the movement of the latch claw 69A in the width direction of the first guide surface 11 (horizontal direction in FIG. 2) when the lever 69 pivots about the pivot shaft 62. This makes it possible to reduce the length L of the above width direction of the latch holes 19A to 19E and the slider hole 32 (see FIG. 20). Consequently, the latch holes 19A to 19E and the slider hole 32 strongly resist deformation when they engage with the latch claw 69A, and the reactive force from the latch claw 69A is reliably supported.

The rail can extend either linearly along the central axial line or in an arc-like form.

In principle, any elastically deformable material can be employed as a component material for the dampener. Preferred examples of the component material include rubber, soft resin, elastomers and other flexible/elastic materials. Representative methods for affixing the dampener material to the latch claw include adhesion, crimping, riveting, screwing, mating and any other general-known attachment methods. When a dampener made of rubber is vulcanized and adhered to the latch claw, a wide adhesion surface is provided. Therefore, the dampener resists being peeled off from the latch claw, thereby achieving longer durability. When the dampener is affixed to the latch claw by riveting, screwing or mating, a simplification of manufacturing process is realized.

While the preferred embodiments provide flanges 69M, 69N of the lever 69 that are disposed within flanges 61M, 61N of the lever support portion 61, of course, it is within the scope of the present teachings to configure the flanges 61M, 61N so that they are disposed within or between the flanges 69M, 69N. In this modification as well, the first amount of lateral play between the lever 69 and the lever support portion 61 is provided and is greater than the second amount of lateral play between the latch claw 69A and the slider hole 32 and/or the latch holes 19A-19E.

The present invention is applicable to tiltable seats in general, and more preferably tiltable vehicle seats.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seat reclining devices and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A vehicle seat reclining device configured to be attached to a vehicle body and to cooperate with a locking device affixed to a tiltable backrest of a vehicle seat for locking tilted positions of the backrest stepwise, the vehicle seat reclining device comprising:
a straight rail extending along a straight central axial line, the rail being affixable to the vehicle body so as to be one of at least substantially tangent to and coaxial with a path traced in space by the locking device as the backrest tilts;
a slider slidably supported on the rail;
a striker affixed to the slider and configured to engage with the locking device; and
a latch mechanism provided between the rail and the slider and configured to selectively permit or prevent sliding of the slider relative to the rail, the latch mechanism including:
a plurality of latch holes defined in the rail along the central axial line,
a slider hole penetrating through the slider and configured to be alignable with the respective latch holes,
a support portion provided on the slider, and
a lever coupled to the support portion so as to be pivotable about a pivot shaft that is disposed substantially parallel to the central axial line, wherein a latch claw is defined at a tip end of the lever and is engageable with the respective latch holes via the slider hole,
wherein a first amount of space is provided between the support portion and the lever in a direction parallel to the central axial line,
a second amount of space is provided between the slider hole and the latch claw in the direction parallel to the central axial line, the second amount of space being less than the first amount of space,
a third amount of space is provided between the respective latch holes and the latch claw in the direction parallel to the central axial line, the third amount of space being at least substantially equal to the second amount of space, and
the support portion and the lever are configured such that, when the latch claw is engaged in the slider hole and in any one of the latch holes, first and second non-zero clearances respectively exist between facing side surfaces of the support portion and the lever at both end sides of the lever in the direction parallel to the central axial line.

2. The vehicle seat reclining device according to claim 1, wherein the latch mechanism further includes a dampener affixed to the latch claw so as to project from lateral edges of the latch claw in the direction parallel to the central axial line, the dampener being configured to abut against the slider hole and the latch hole while undergoing elastic deformation when the latch claw advances towards the rail.

3. The vehicle seat reclining device according to claim 2, wherein the dampener comprises an elastomeric material.

4. The vehicle seat reclining device according to claim 3, wherein the dampener is generally planar and is adhered to the latch claw.

5. The vehicle seat reclining device according to claim 3, wherein the dampener is annular and is mechanically fastened to the latch claw.

6. The vehicle seat reclining device according to claim 1, further comprising an elastic material affixed to the latch claw and configured to be inserted into the latch holes, the elastic material having a width in the direction parallel to the central axial line that is wider than the width of the latch claw in the direction parallel to the central axial line.

7. The vehicle seat reclining device according to claim 1, wherein the slider hole is configured to act as a stop for the latch claw in the direction parallel to the central axial line and to prevent the lever from being forcibly pressed against the support portion in the direction parallel to the central axial line.

8. The vehicle seat reclining device according to claim 1, wherein the first amount of space is within the range of about 0.1 mm to 4.0 mm,
the second amount of space is within the range of about 0.05 mm to 1.0 mm and is smaller or less than the first amount of space,
the third amount of space is within the range of about 0.05 mm to 1.0 mm, and
the first and second non-zero clearances are each within the range of about 0.05 mm to 2.0 mm and are equal to, or are at least substantially equal to each other, when the latch claw is positioned in the middle of the slider hole in the direction parallel to the central axial line.

9. The vehicle seat reclining device according to claim 1, wherein the first amount of space is within the range of about 0.2 mm to 2.0 mm, and
the second amount of space is within the range of about 0.1 mm to 0.5 mm and is smaller or less than the first amount of space,
the third amount of space is within the range of about 0.1 mm to 0.5 mm, and
the first and second non-zero clearances are each within the range of about 0.1 mm to 1.0 mm and are equal to, or are at least substantially equal to each other, when the latch claw is positioned in the middle of the slider hole in the direction parallel to the central axial line.

10. The vehicle seat reclining device according to claim 1, wherein flanges extend from peripheral edges of the slider hole in a direction perpendicular to the central axial line.

11. The vehicle seat reclining device according to claim 1, wherein flanges extend from peripheral edges of the latch holes in a direction perpendicular to the central axial line.

12. The vehicle seat reclining device according to claim 1, wherein the lever further includes an intermediate portion that extends perpendicularly relative to the latch claw.

13. The vehicle seat reclining device according to claim 1, wherein the lever further includes an intermediate portion that extends at an acute angle relative to the latch claw.

14. The vehicle seat reclining device according to claim 1, wherein the rail extends linearly along the central axial line,
clearances are provided between the rail and each side of the slider in a width direction, the width direction being orthogonal to a rotational axis serving as an axis of the latch claw when it is in engagement with the latch hole and also being orthogonal to the central axial line, and
rotatable portions project from each side of the slider in the width direction and at least narrow the clearances so as to guide rotation of the slider relative to the rail around the rotational axis.

15. The vehicle seat reclining device according to claim 14, wherein the striker is configured so as to be at least substantially aligned with the central axial line when the slider is in its base rotational position such that the slider is not rotationally offset around the rotational axis relative to the rail, and the rail, the slider and the striker are each configured to be line symmetric relative to the central axial line.

16. The vehicle seat reclining device according to claim 1, wherein the latch holes each include a first side that is orthogonal to the central axial line and extends in directions away from the central axial line and a second side that is orthogonal to the central axial line and faces the first side, the first side and the second side bounding the latch claw therebetween along the central axial line when the latch claw is engaged in the respective latch holes, a first distance between the first side and the second side widens in directions moving away from the central axial line, the slider hole includes a third side that is orthogonal to the central axial line and extends in directions away from the central axial line and a fourth side that is orthogonal to the central axial line and faces the third side, the third side and the fourth side bounding the latch claw therebetween along the central axial line when the latch claw is engaged in the respective latch holes, and a second distance between the third side and the fourth side widens in directions moving away from the central axial line.

17. The vehicle seat reclining device according to claim 6, wherein:

the slider hole is configured to act as a stop for the latch claw in the direction parallel to the central axial line and to prevent the lever from being forcibly pressed against the support portion in the direction parallel to the central axial line, flanges extend from peripheral edges of the slider hole and the latch holes in a direction perpendicular to the central axial line, the rail extends linearly along the central axial line, clearances are provided between the rail and each side of the slider in a width direction, the width direction being orthogonal to a rotational axis serving as an axis of the latch claw when it is in engagement with a respective latch hole and also being orthogonal to the central axial line, rounded portions project from each side of the slider in the width direction and at least narrow the clearances so as to guide rotation of the slider relative to the rail around the rotational axis, the striker is configured so as to be at least substantially aligned with the central axial line when the slider is in its base rotational position such that the slider is not rotationally offset around the rotational axis relative to the rail, the rail, the slider and the striker are each configured to be line symmetric relative to the central axial line, the latch holes each include a first side that is orthogonal to the central axial line and extends in directions away from the central axial line and a second side that is orthogonal to the central axial line and faces the first side, the first side and the second side bounding the latch claw therebetween along the central axial line when the latch claw is engaged in the respective latch hole, a distance between the first side and the second side widens in directions moving away from the central axial line.

18. An apparatus comprising:

a straight rail defining a plurality of discrete latch holes disposed along a straight central axial line thereof, the rail being configured to be fixedly attached to a lateral side of a vehicle body, a slider supported on the rail so as to be selectively slidable along the central axial line and to be pivotable about a rotational axis that is perpendicular to the central axial line, wherein a slider hole is defined in the slider so as to be alignable with the respective latch holes, a striker fixedly attached to the slider at a position spaced from the rotational axis of the slider and configured to be engaged by a locking device affixed to a vehicle seatback, and at least one latch comprising a latch support fixedly attached to the slider and a lever coupled to the latch support so as to be pivotable about an axis parallel to the central axial line, the lever having a latch claw that is selectively engageable with the respective latch holes, wherein engagement of the latch claw with at least one latch hole prevents the slider from sliding along the central axial line, wherein a first amount of lateral space is defined between the latch support and the lever in a direction parallel to the central axial line, a second amount of lateral space is defined between the slider hole and the latch claw in the direction parallel to the central axial line, the second amount of lateral space being less than the first amount of lateral space, a third amount of space is provided between the respective latch holes and the latch claw in the direction parallel to the central axial line, the third amount of space being at least substantially equal to the second amount of space, and the latch support and the lever are configured such that, when the latch claw is engaged in the slider hole and any one of the latch holes, a non-zero clearance exists between facing side surfaces of the latch support and the lever at both end sides thereof in the direction parallel to the central axial line.

19. The apparatus according to claim 18, wherein:

the slider hole is configured to act as a stop for the latch claw in the direction parallel to the central axial line and to prevent the lever from being forcibly pressed against the latch support in the direction parallel to the central axial line, and an elastic material is affixed to the latch claw, the elastic material having a width in the direction parallel to the central axial line that is wider than the width of the latch claw in the direction parallel to the central axial line.

20. The apparatus according to claim 19, wherein a rounded portion is provided on a portion of each lateral side of the slider in the width direction, the rounded portions slidably contacting corresponding lateral sides of the rail in a direction perpendicular to the central axial line and being configured to guide pivotal movement of the slider within the rail about the rotational axis.

* * * * *